United States Patent [19]
Goto

[11] Patent Number: 5,465,226
[45] Date of Patent: Nov. 7, 1995

[54] HIGH SPEED DIGITAL PARALLEL MULTIPLIER

[75] Inventor: Gensuke Goto, Ebina, Japan

[73] Assignee: Fujitsu Limited, Kawasaki, Japan

[21] Appl. No.: 354,016

[22] Filed: Dec. 5, 1994

Related U.S. Application Data

[63] Continuation of Ser. No. 179,827, Jan. 11, 1994, abandoned, which is a continuation of Ser. No. 67,169, May 26, 1993, abandoned, which is a continuation of Ser. No. 672,862, Mar. 20, 1991, abandoned.

[30] Foreign Application Priority Data

Mar. 20, 1990 [JP] Japan .................................. 2-072384
Feb. 5, 1991 [JP] Japan .................................. 3-013629

[51] Int. Cl.[6] .................................................. G06F 7/52
[52] U.S. Cl. .................................... 364/757; 364/760
[58] Field of Search ................................. 364/754–760

[56] References Cited

U.S. PATENT DOCUMENTS

| | | | |
|---|---|---|---|
| 4,168,530 | 9/1979 | Gajski et al. | 364/760 |
| 4,545,028 | 10/1985 | Ware | 364/760 |
| 4,745,570 | 5/1988 | Diedrich et al. | 364/760 |
| 4,748,584 | 5/1988 | Noda | 364/760 |
| 4,752,905 | 6/1988 | Nakagawa et al. | 364/760 |

FOREIGN PATENT DOCUMENTS

| | | |
|---|---|---|
| 0206762 | 12/1986 | European Pat. Off. . |
| 55-105732 | 8/1980 | Japan . |
| 63-55627 | 3/1988 | Japan . |
| 1-134527 | 5/1989 | Japan . |
| 90/00773 | 1/1990 | WIPO . |

OTHER PUBLICATIONS

The Westin Copley Place Hotel, Proceedings of the IEEE 1990 Custom Integrated Circuits Conference, May 13–16, 1990, Boston, Massachusetts.

T. Sato et al., A Regularly Structured 54–Bit Modified–Wallace Tree Multiplier, Aug. 20–22, 1991, Edinburgh, Scotland.

*Primary Examiner*—Roy N. Envall, Jr.
*Assistant Examiner*—Chuong D. Ngo
*Attorney, Agent, or Firm*—Staas & Halsey

[57] ABSTRACT

A plurality of multiplicand bit transmission lines and a plurality of multiplier bit transmission lines or their decoding signal transmission lines are arranged in a two-dimensional plane, and partial product generators are arranged at their intersections. A plurality of rows of first multi-input adders are arranged at predetermined numbers of rows, and at least one row of second multi-input adders are arranged at predetermined numbers of the first multi-input adders. A basic cell is formed by a predetermined number of partial product generators and one first multi-input adder, and the basic cells are repetitively arranged to obtain a rectangular configuration.

18 Claims, 50 Drawing Sheets

Fig. 1
PRIOR ART

```
                           SIGN BIT
                              ↓
                              a7  a6  a5  a4  a3  a2  a1  a0  MULTIPLICAND (X)
                           x) b7  b6  b5  b4  b3  b2  b1  b0  MULTIPLIER (Y)
                           ─────────────────────────────────
                                              a7b0 a6b0 a5b0 a4b0 a3b0 a2b0 a1b0 a0b0  =PP0
                                         a7b1 a6b1 a5b1 a4b1 a3b1 a2b1 a1b1 a0b1       =PP1
                                    a7b2 a6b2 a5b2 a4b2 a3b2 a2b2 a1b2 a0b2
                               a7b3 a6b3 a5b3 a4b3 a3b3 a2b3 a1b3 a0b3
                          a7b4 a6b4 a5b4 a4b4 a3b4 a2b4 a1b4 a0b4
                     a7b5 a6b5 a5b5 a4b5 a3b5 a2b5 a1b5 a0b5
                a7b6 a6b6 a5b6 a4b6 a3b6 a2b6 a1b6 a0b6
           a7b7 a6b7 a5b7 a4b7 a3b7 a2b7 a1b7 a0b7                                     =PP7
           ─────────────────────────────────────────────────
           Z14  Z13  Z12  Z11 Z10  Z9  Z8  Z7  Z6  Z5  Z4  Z3  Z2  Z1  Z0 (=X·Y)
            1    2    3    4   5   6   7   8   7   6   5   4   3   2   1    NUMBER OF
                                                                            INPUTS
                                                                            TO MULTI-INPUT
                                                                            ADDER
```

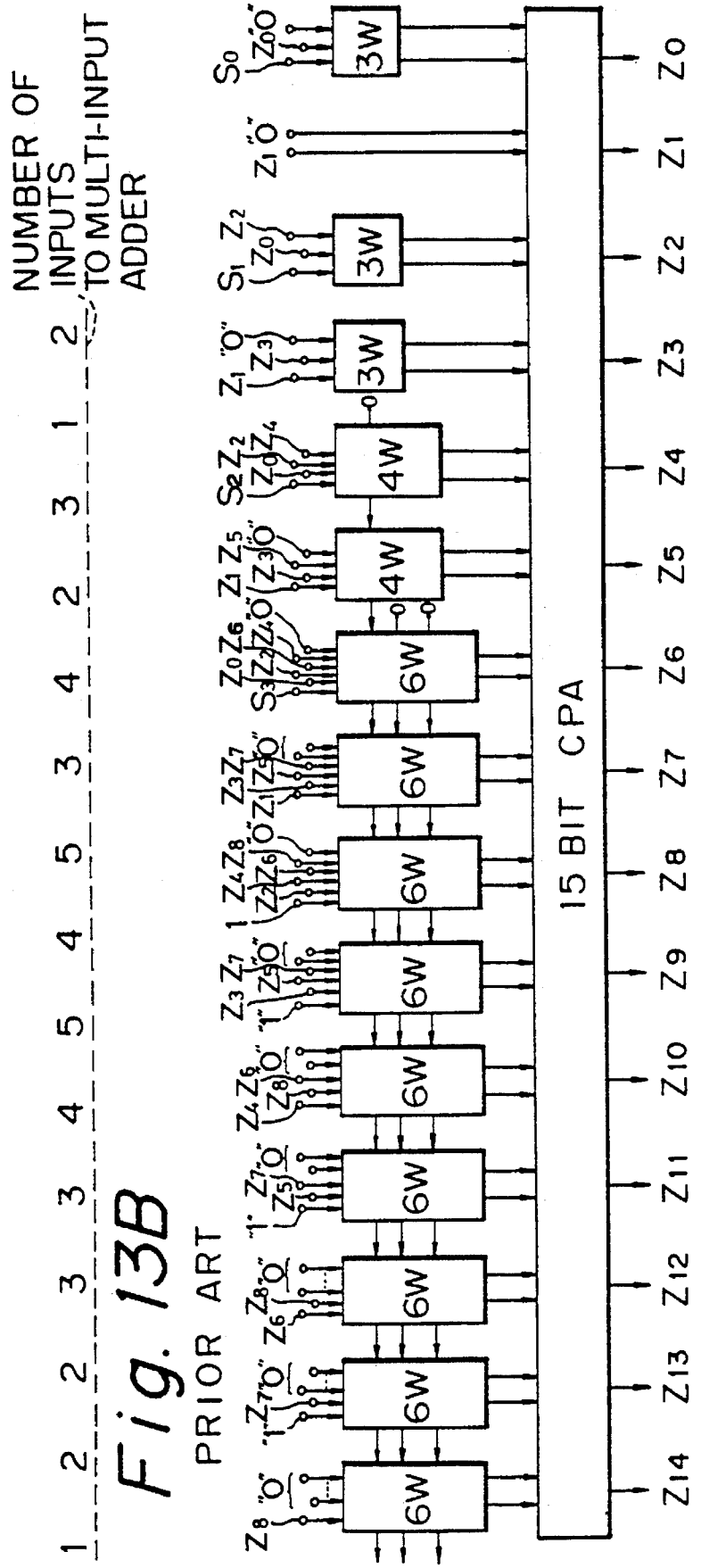

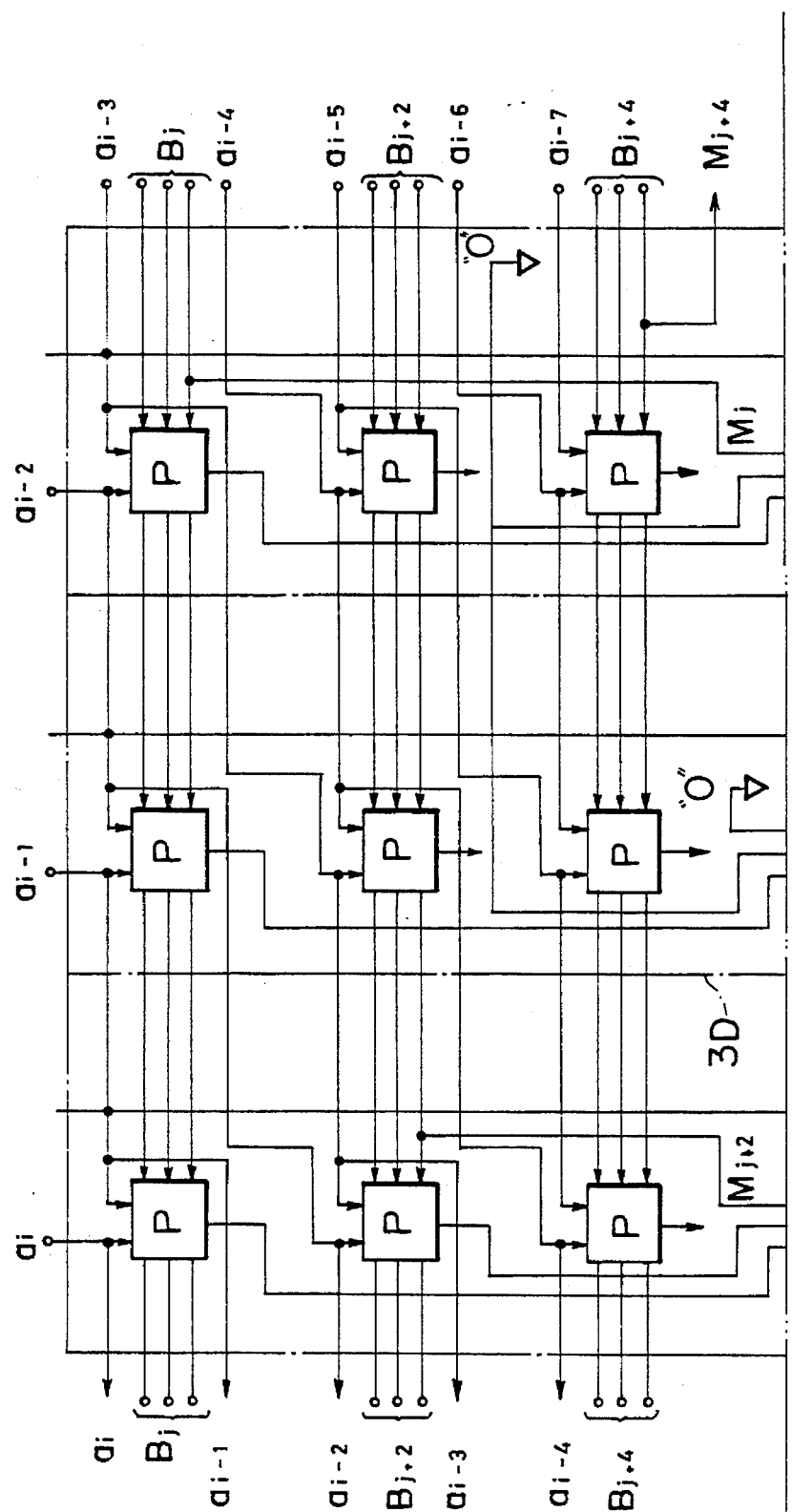

| Fig. 23A |
| Fig. 23B |
| Fig. 23C |

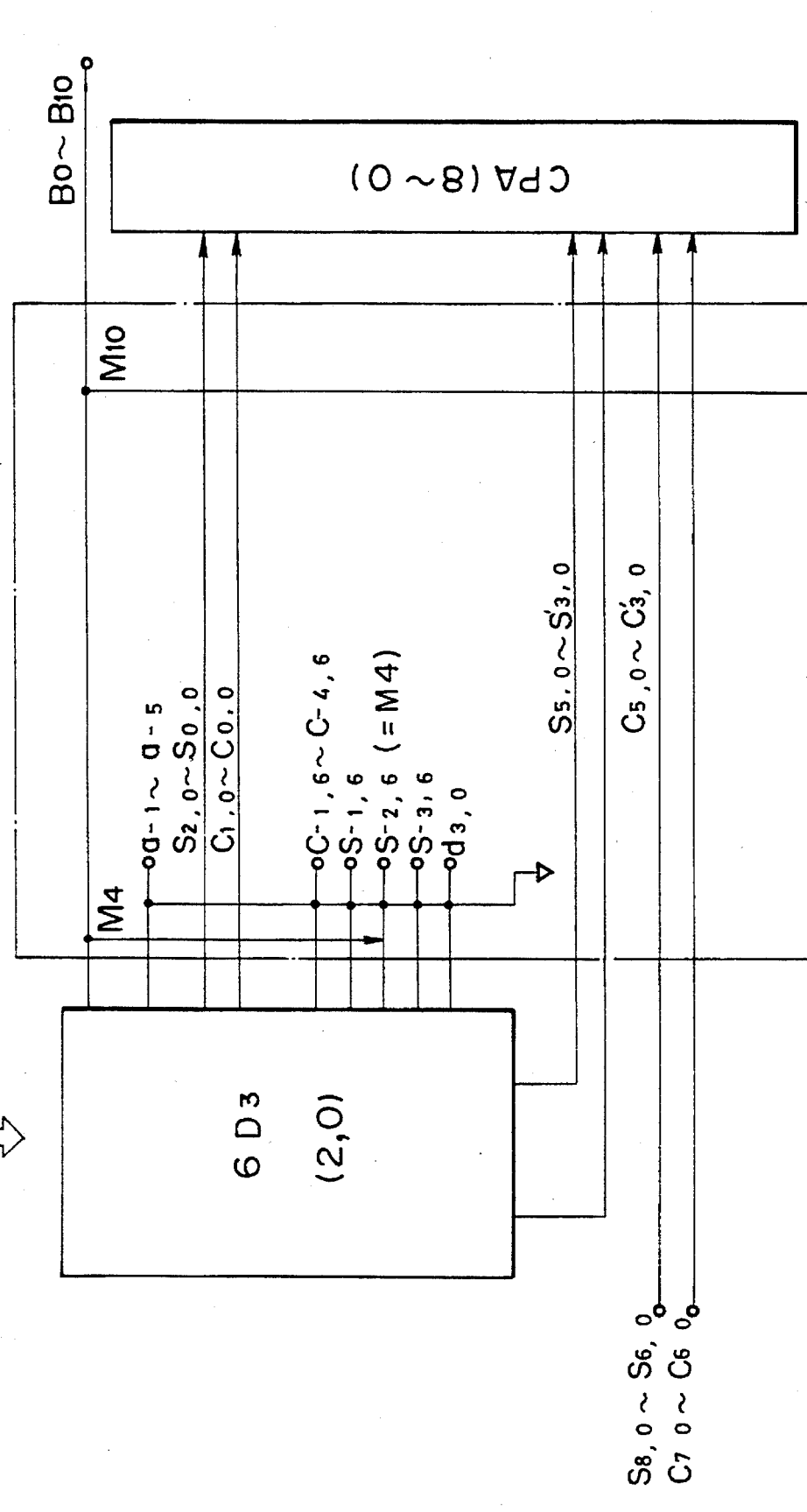

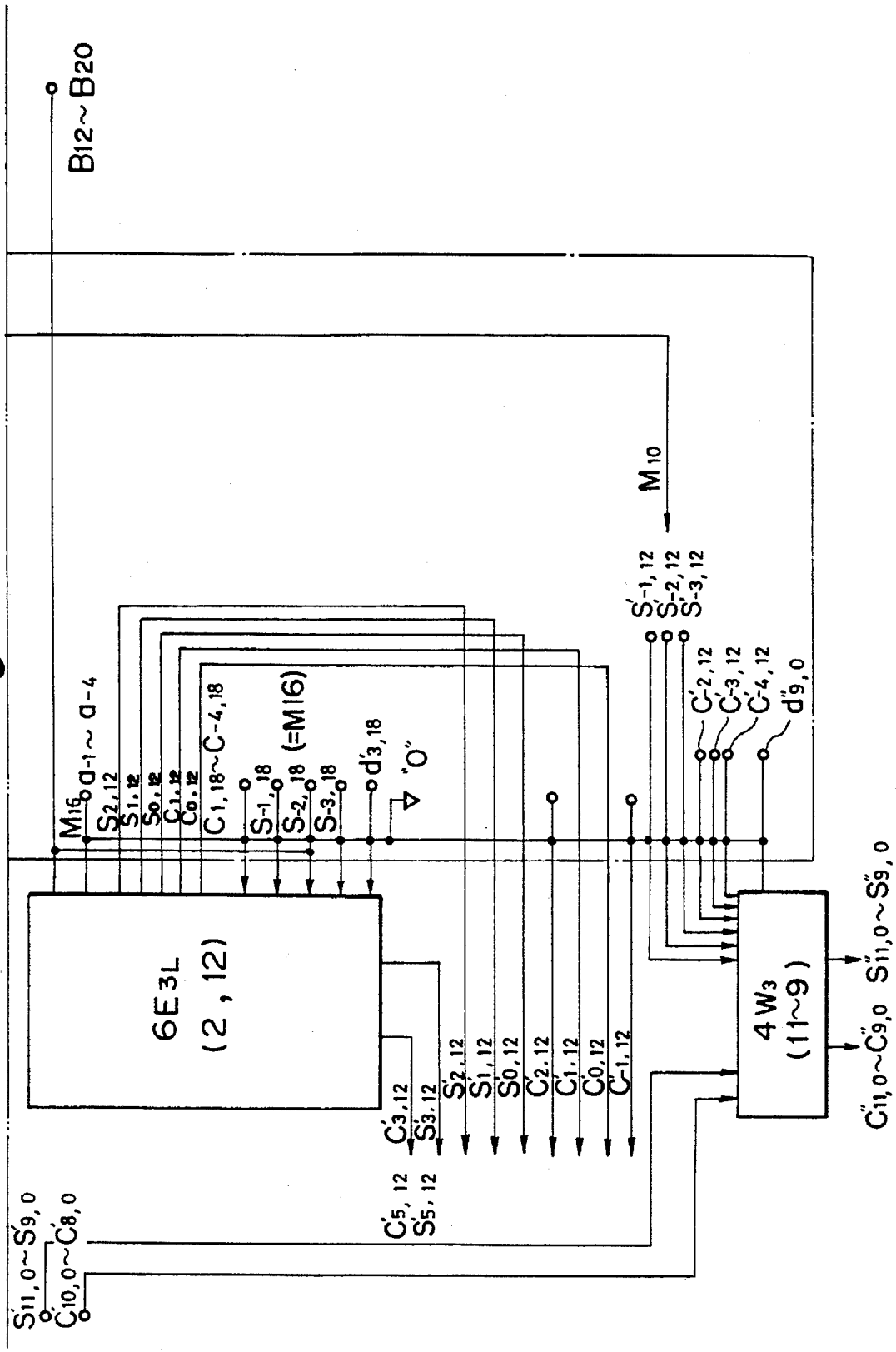

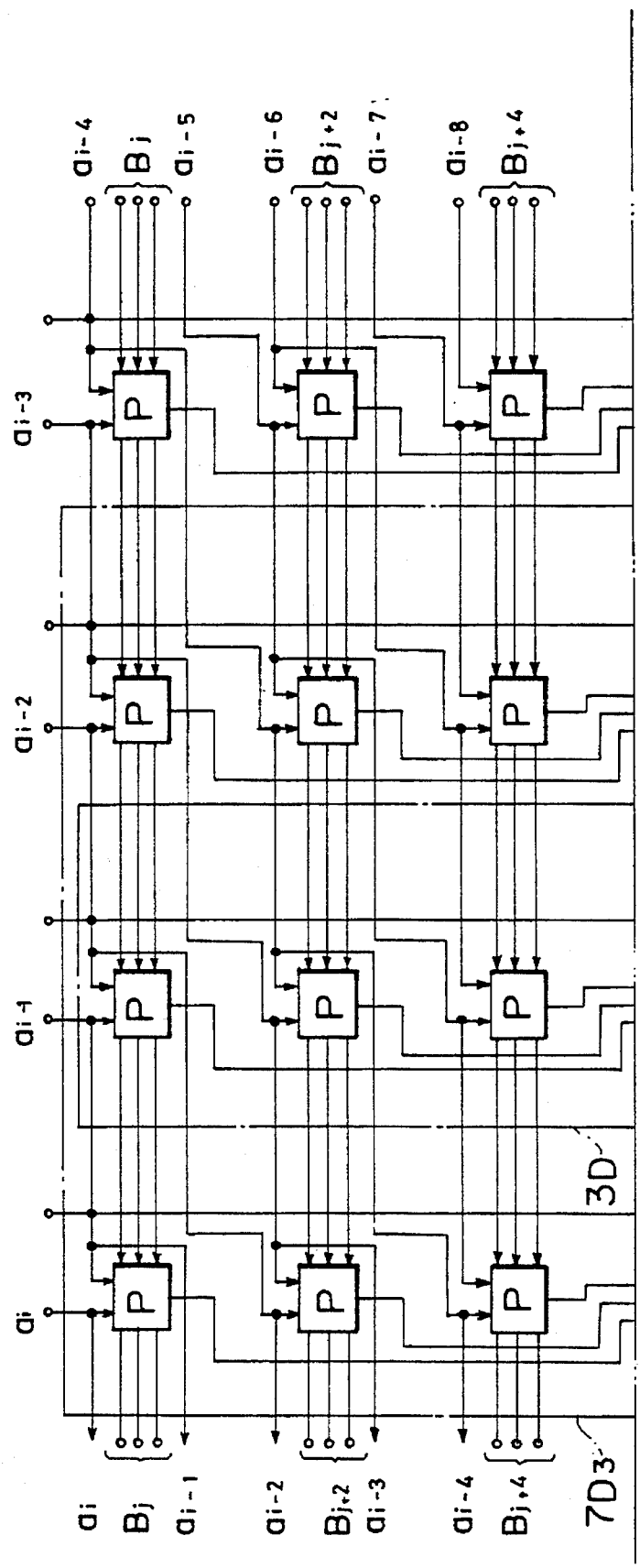

| Fig. 33A |
| Fig. 33B |

# HIGH SPEED DIGITAL PARALLEL MULTIPLIER

This is a continuation of U.S. application No. 08/179,827, filed Jan. 11, 1994, now abandoned, in turn a continuation of U.S. application No. 08/067,169, filed May 26, 1993, now abandoned, in turn a continuation of 07/672,862, filed Mar. 20, 1991, now abandoned.

BACKGROUND OF THE INVENTION

1. Field of the Invention

The present invention relates to a multiplier, and more particularly, to a high speed digital parallel multiplier, which is, for example, used as a multiplier block in an integer calculating unit (IU) or a floating-point calculating unit (FPU) incorporated into a microprocessor or a digital signal processor (DSP).

2. Description of the Related Art

In general, in order to carry out multiplication of an M-bit operand (multiplicand) and an N-bit operand (multiplier), the multiplicand is multiplied by each bit of the multiplier to generate a partial product. Then, the partial product is shifted in accordance with the bit of the multiplier. Finally, the shifted partial products are added to obtain a final product. For this purpose, multi-input adders are arranged in a two-dimensional plane.

As methods of arrangement of adders, there are two methods: a carry save array (CSA) method and a Wallace tree method.

The CSA method processes bits one by one to supply a carry signal to an adder located at a one-bit higher position. This is similar to a manual calculation method, where the layout thereof corresponds to the logic and is regular, and therefore, the design of layouts is easy. However, in the CSA method, since an execution time depends upon the number of bits of the multiplier, there is some difficulty in achieving high speed operation.

On the other hand, in the Wallace tree method, three bit signals are supplied to a one-bit full adder which is called a three-input Wallace tree circuit (a full adder) "3W", and the output signal (sum signal) is supplied to the next stage full adder of the same bit, and the carry output signal thereof is supplied to the next stage full adder located at a one-bit higher position. In the Wallace tree method, although the speed of operation is high, the circuit layout is not easy since the circuit is irregular.

In a prior art multiplier, the arrangement of adders is a parallelogram which however creates empty or useless areas, thus reducing the integration density of the multiplier. In order to increase the integration density, a multiplier whose arrangement is rectangular has been suggested in Japanese Laid-open Patent Application 55-105732, which will be later explained. In this multiplier, however, the speed of operation is not improved.

SUMMARY OF THE INVENTION

An object of the present invention is to provide a multiplier which is easy to by out, and which can obtain a high degree of integration and high speed operation.

According to the present invention, in a multiplier, a plurality of multiplicand bit transmission lines and a plurality of multiplier bit transmission lines or their decoding signal transmission lines are arranged in a two-dimensional plane, and partial product generators are arranged at their intersections. A plurality of rows of first multi-input adders are arranged at predetermined numbers of rows, and at least one row of second full adders are arranged at predetermined numbers of the first multi-input adders. A basic cell is formed by a predetermined number of partial product generators and one first multi-input adder, and the basic cells are repetitively arranged to obtain a rectangular configuration.

Due to the rectangular configuration, the density of integration can be increased. Also, the signal transmission length can be reduced to increase the speed of operation.

BRIEF DESCRIPTION OF THE DRAWINGS

The present invention will be more clearly understood from the description as set forth below, with reference to the accompanying drawings, wherein:

FIG. 1 is a diagram illustrating a prior art multiplication process;

FIG. 8, 8A and 8B are a partial detailed block circuit diagram of the circuit of FIG. 7;

FIG. 13A is a diagram illustrating 8×8 bit multiplication using a 2nd-order modified Booth algorithm;

FIG. 13B is a block circuit diagram illustrating a Wallace tree configuration realizing an adder array for the multiplication of FIG. 13A;

FIG. 17, 17A, 17B and 17C are a detailed block circuit diagram of the block $6D_3$ of FIG. 16;

FIG. 19, 19A, 19B and 19C are a block circuit diagram of the block $6D_{3L}$ of FIG. 16;

FIG. 20, 20A, 20B and 20C are a block circuit diagram of the block $6D_{4H}$ of FIG. 16;

FIG. 27, 27A and 27B are a block circuit diagram of the block 12F of FIG. 16;

FIG. 28, 28A, 28B and 28C are a block circuit diagram of the block $7D_3$;

FIGS. 32, 32A, 32B and 33, 33A, 33B are block circuit diagrams of multipliers combining a plurality of the blocks of FIGS. 29 and 30;

DESCRIPTION OF THE PREFERRED EMBODIMENTS

Before the description of embodiments of the present invention, prior art multipliers will be explained.

In FIG. 1, which illustrates a prior art 8×8 bit multiplication process, a multiplicand X is designated by $a_0$ to $a_7$, and a multiplier Y is designated by $b_0$ to $b_7$. Here, X and Y are represented by a complement based on 2, and their most significant bits (MSB) $a_7$ and $b_7$ are sign bits.

First, a partial product $PP_i$ (i=0–7) is obtained multiplying X ($a_7$, $a_6$, ..., $a_0$) by by $b_i$ (i=0–7). Then, a final product X·Y is obtained by accumulating partial products $PP_0$, $PP_1$, ..., and $PP_7$. In this case, each sum $Z_i$ (i=0–14) for one bit is calculated, and the sums $Z_i$ (i=0–14) are accumulated.

Figure 2:
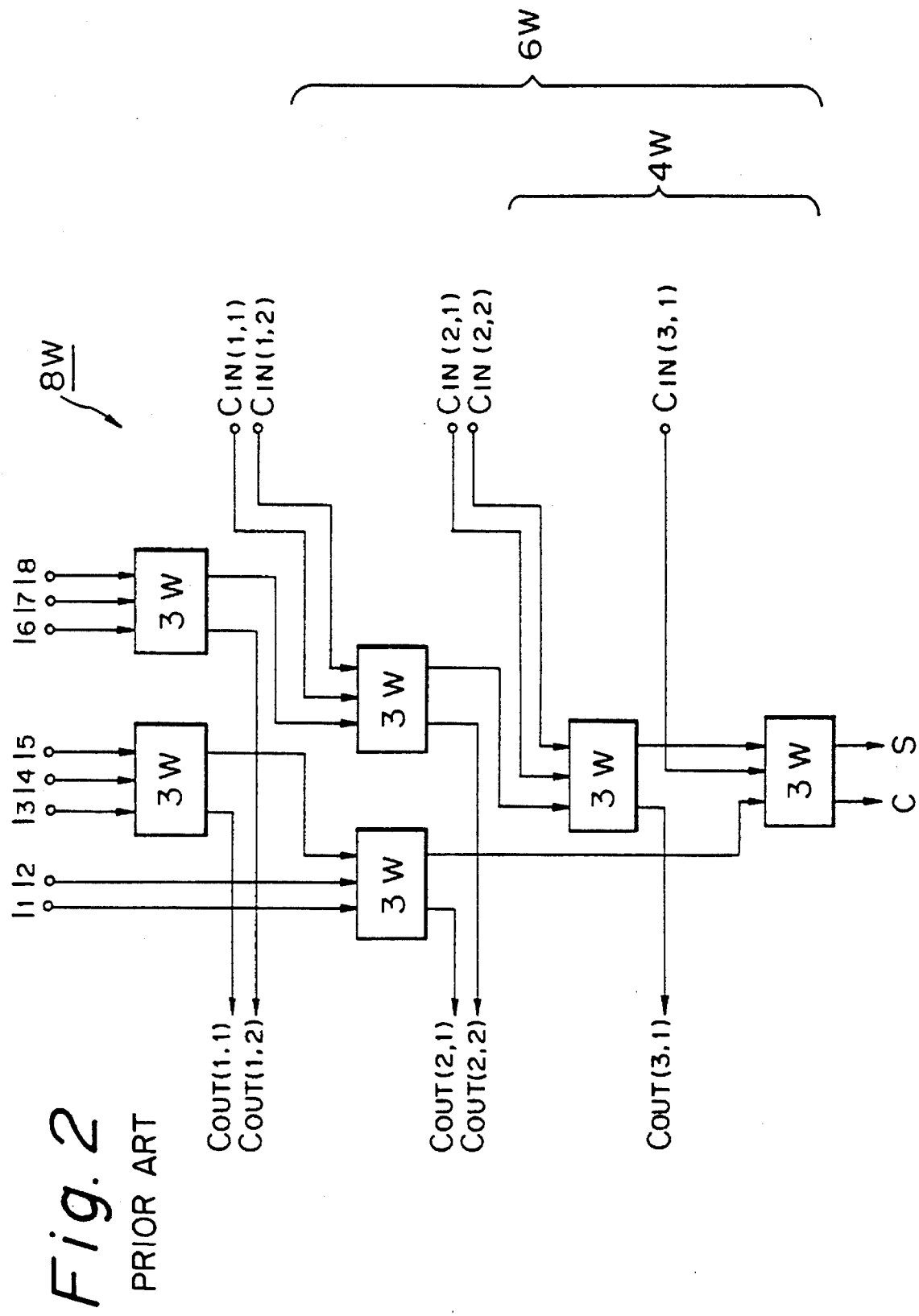
FIG. 2 is a block circuit diagram of an 8-input Wallace tree circuit.
Figure 3:
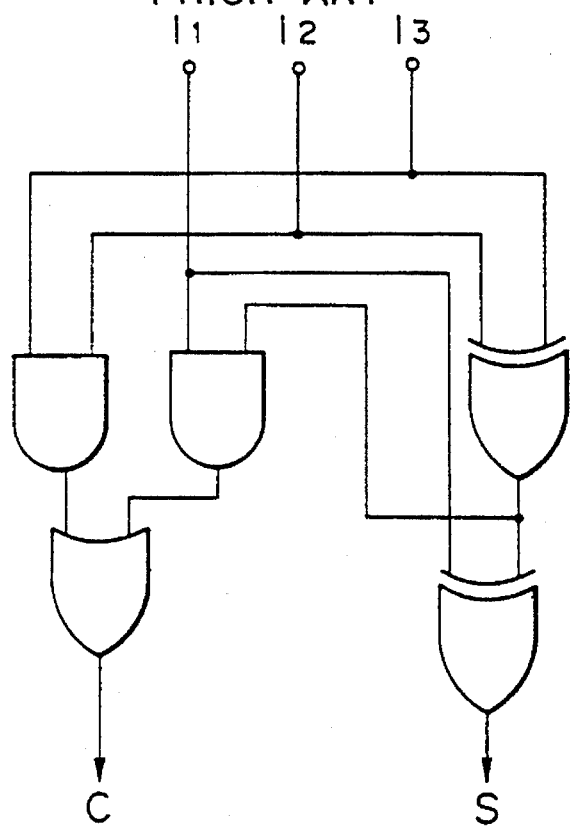
FIG. 3 is a logic circuit diagram of a 3-input Wallace tree circuit (a full adder)

As illustrated in FIG. 1, in order to calculate sum $Z_i$, an 8-bit input adder, i.e., an 8-input Wallace tree circuit "8W" as illustrated in FIG. 2 is required. This 8-input Wallace tree circuit 8W has six full adder circuits "3W" as illustrated in FIG. 3. Therefore, if the processing time of the full adder (3-input Wallace tree circuit) 3W is τ, the processing time of 8-input Wallace tree circuit 8W is 4τ. In FIG. 2, note that $C_{IN}$ (1, 1), $C_{IN}$ (1, 2), ... designates carry-in signals from the lower bit position, and $C_{OUT}$ (1, 1), $C_{OUT}$ (1, 2), ... designates carry-out signals to the higher bit position.

Figure 4:
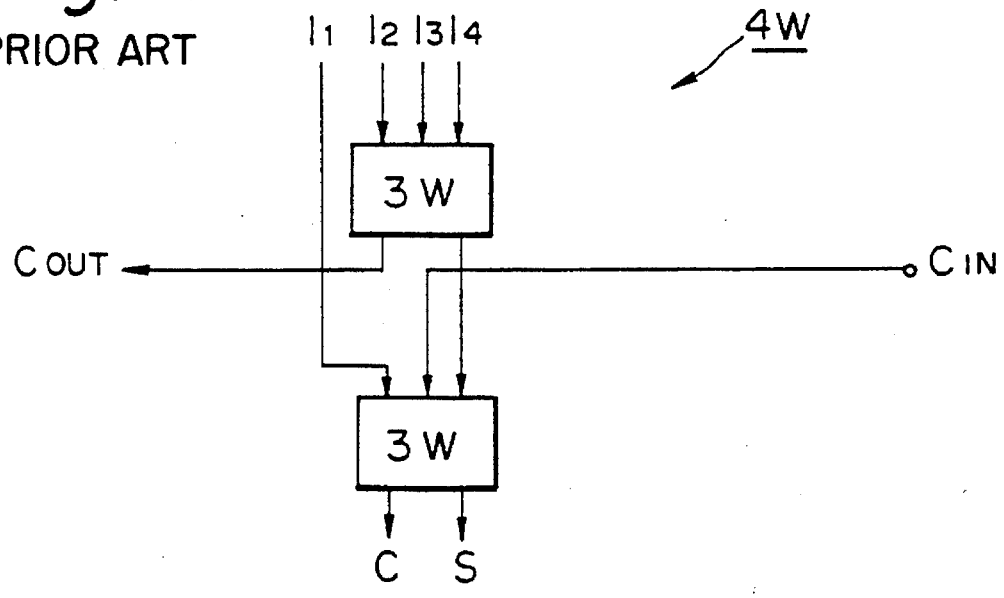
FIG. 4 is a block circuit diagram of a 4-input Wallace tree circuit.
Figure 5:
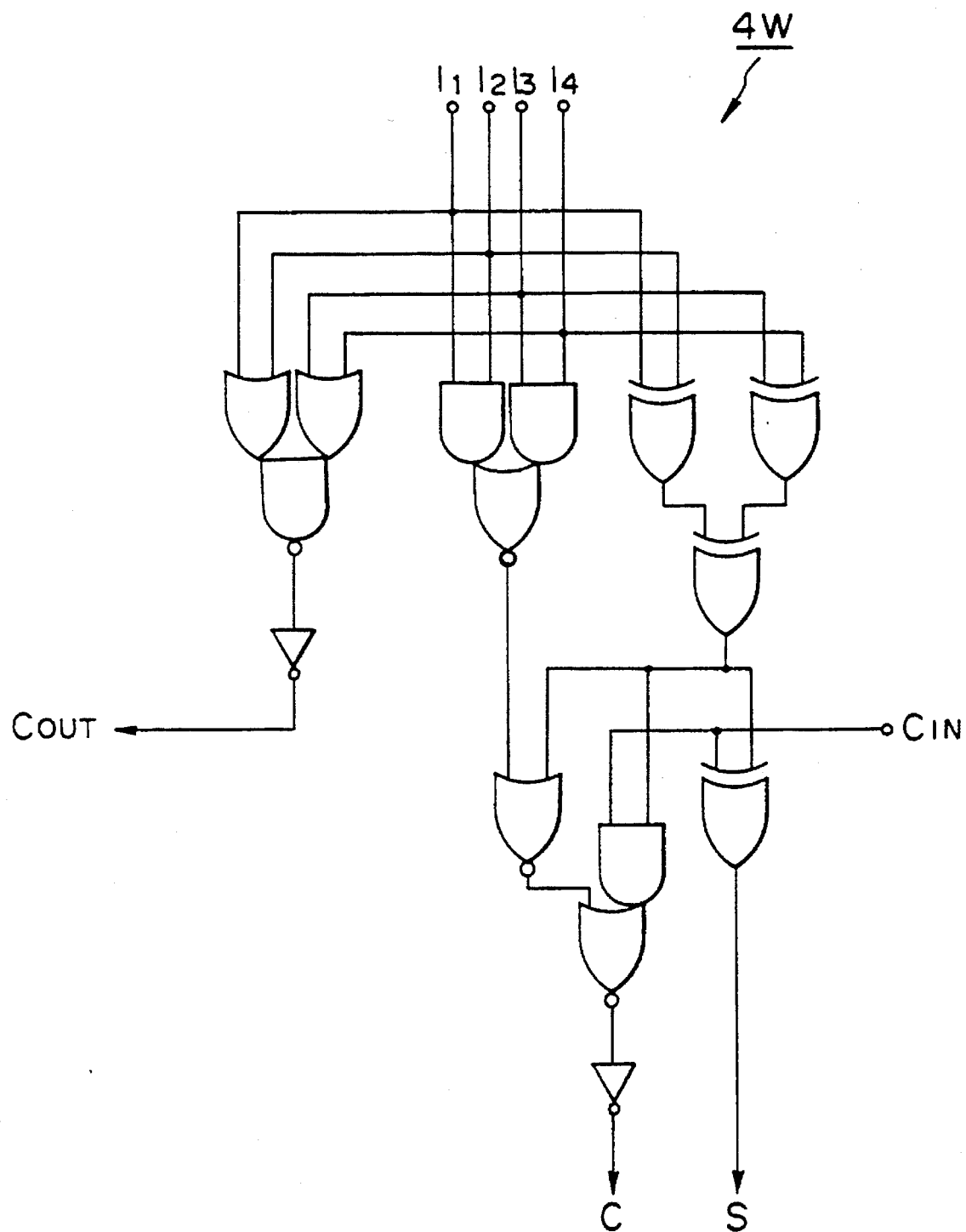
FIG. 5 is a logic circuit diagram of another 4-input Wallace tree circuit.

Contrary to the above, recently a multi-input adder circuit is divided into units of 4 inputs, so as to repeat the operation of a 4-input Wallace tree circuit "4W" as illustrated in FIG. 4, thus constituting a digital parallel multiplier. In this case, when the multiplier is made of a large scale integrated circuit (LSI), a complex circuit such as an 8-input Wallace tree circuit 8W or other multi-input Wallace tree circuit with more inputs is unnecessary, and the logic and layout of the multiplier is carried out by a relatively simple configuration, thereby reducing the number of design steps. Note that, if the 4-input Wallace tree circuit 4W is constructed as illustrated in FIG. 5, an 8-input adding process can be processed in a time of 3τ, thereby increasing the speed of the operation of the entire multiplier.

Figure 6:
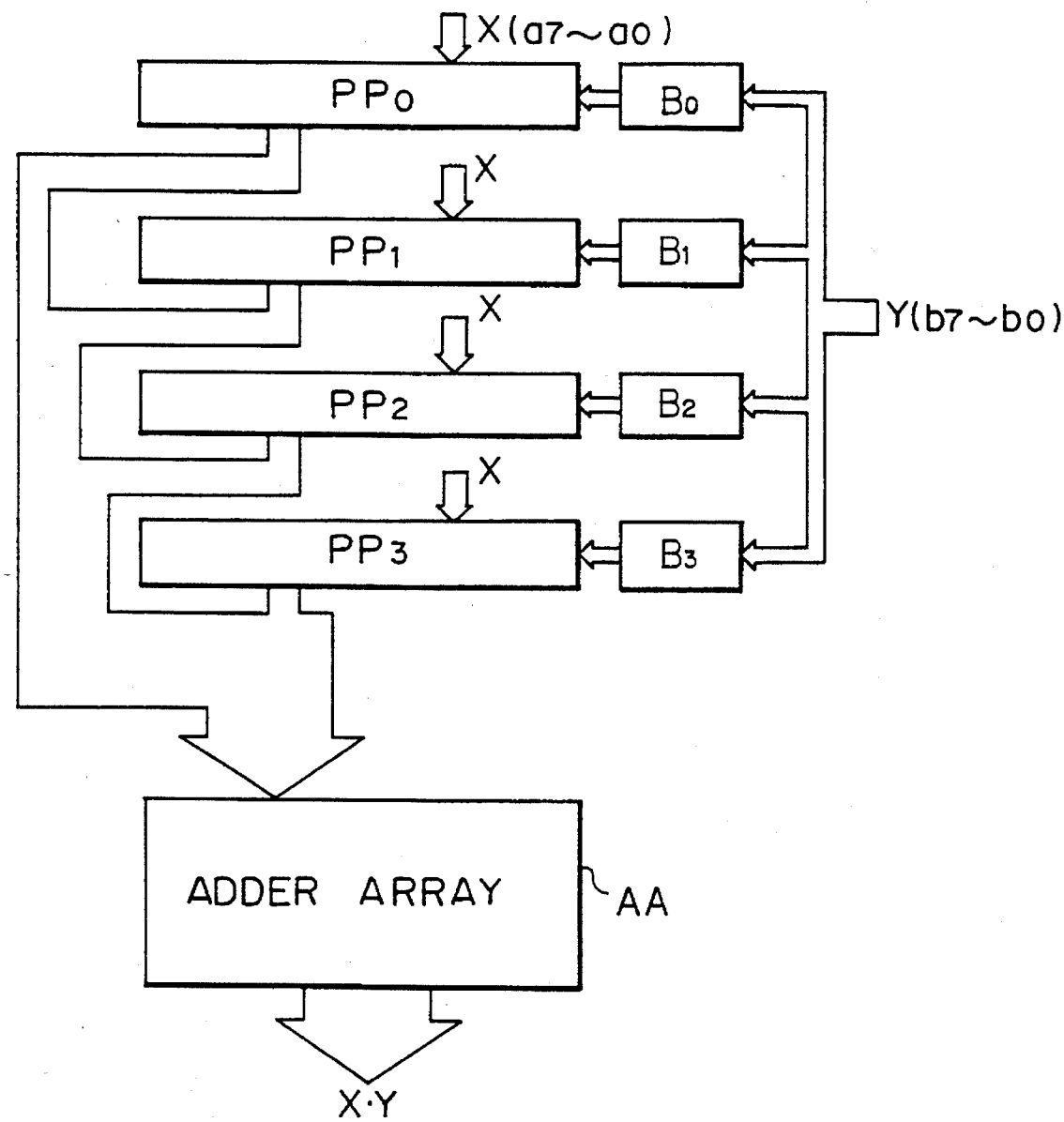
FIG. 6 is a schematic block circuit diagram illustrating a prior art multiplier using a 2nd-order modified Booth algorithm.

To increase the operation speed of the entire multiplier, a modified Booth algorithm has been suggested as illustrated in FIG. 6, which uses a 2nd-order modified Booth algorithm. In FIG. 6, $PP_0$, $PP_1$, $PP_2$, and $PP_3$ designate partial product generators; $B_0$, $B_1$, $B_2$, and $B_3$ designate 2nd-order Booth (Y) decoders; and AA designates an adder array. Each of the partial product generators $PP_0$, $PP_1$, $PP_2$, and $PP_3$ generate 0, ±X, ±2X in response to the outputs of the Y decoders $B_0$, $B_1$, $B_2$, and $B_3$ respectively. The resultant outputs of the partial product generators $PP_0$, $PP_1$, $PP_2$, and $PP_3$ are added at the adder array AA.

According to the Modified Booth algorithm, the number of partial product generators is reduced (see FIG. 1), thereby increasing the speed of the addition operation.

Figure 7:
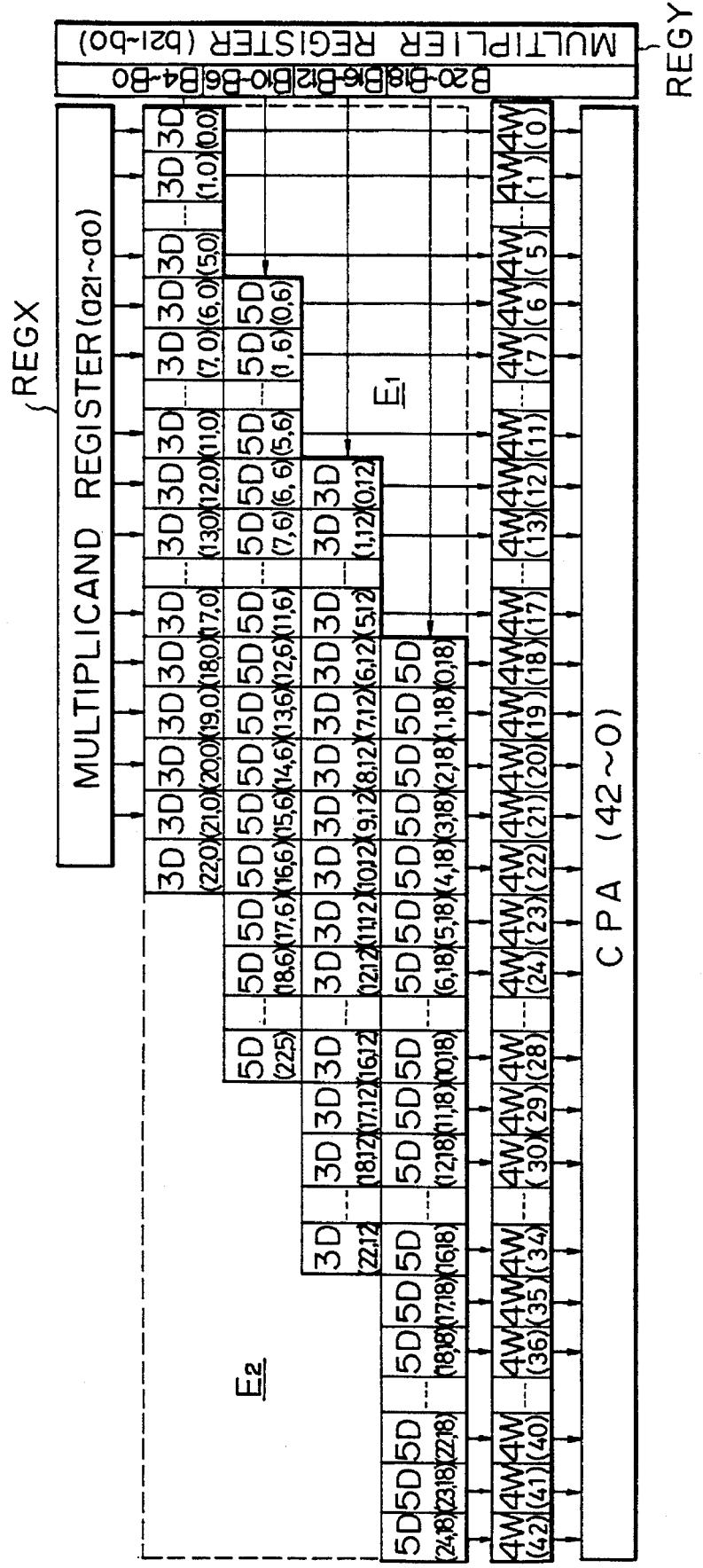
FIG. 7 is a block circuit diagram illustrating a prior art 22×22 bit multiplier using a 2nd-order modified Booth algorithm.
Figure 8A:
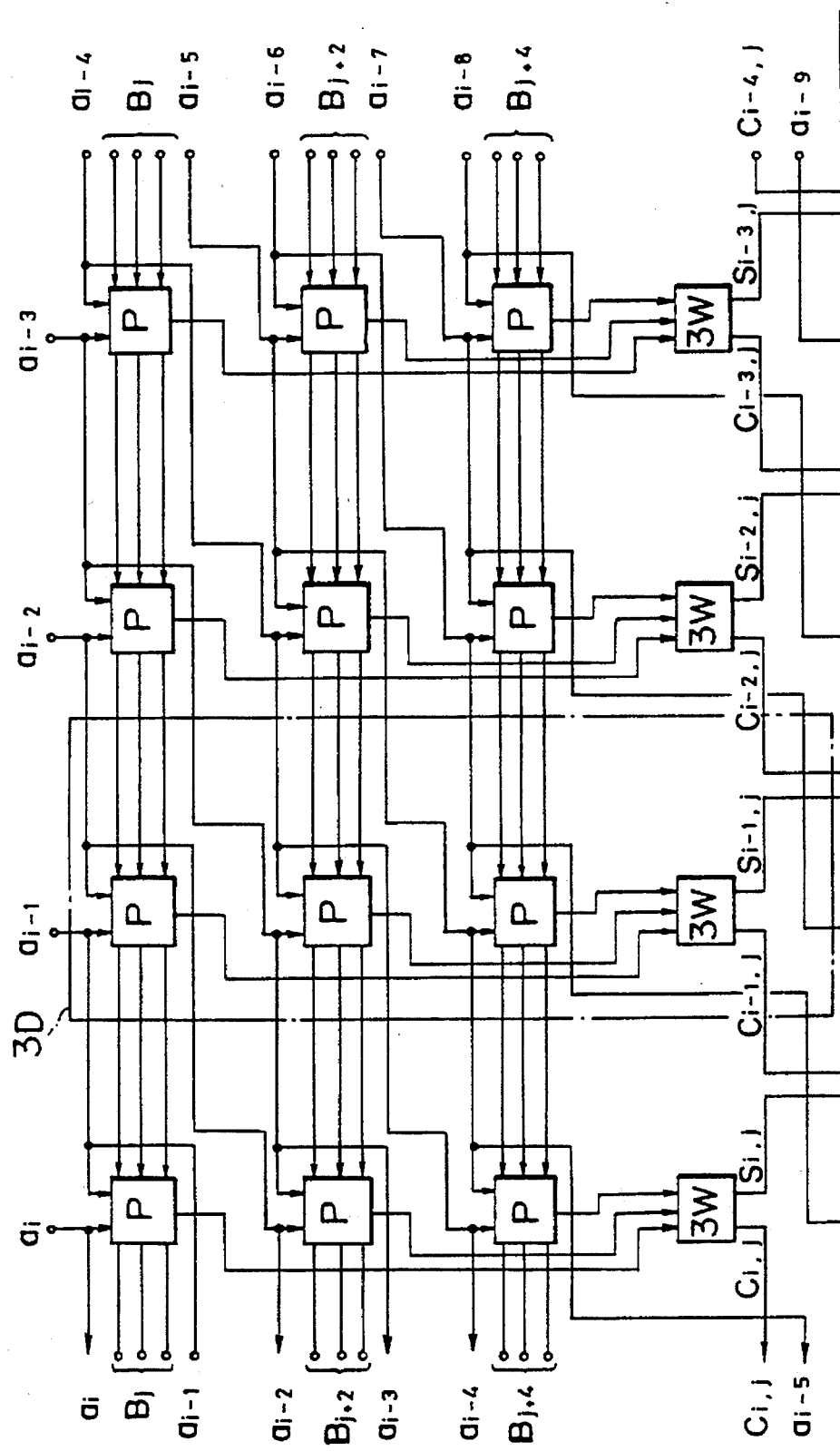
Figure 8B:
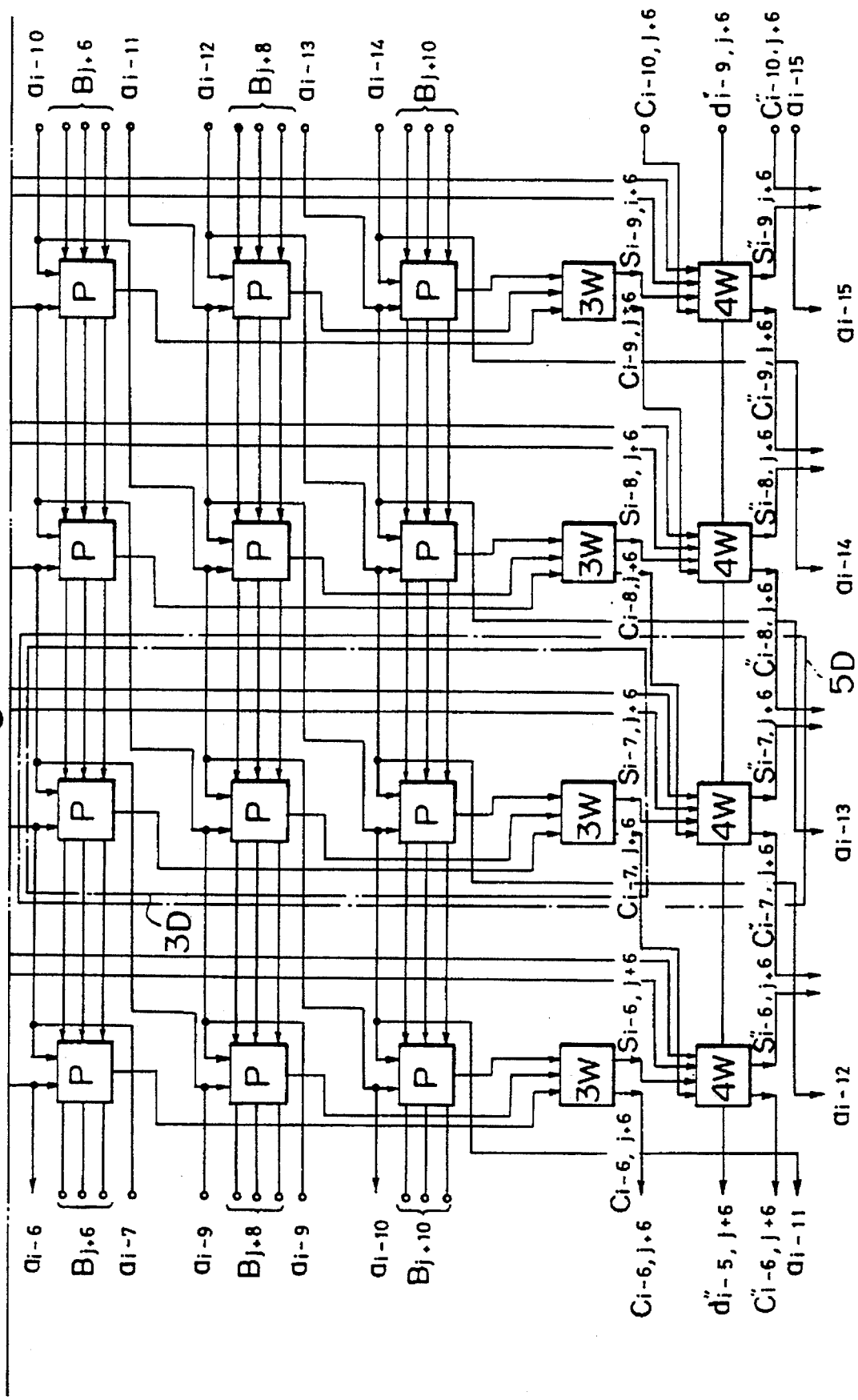
Figure 9A:
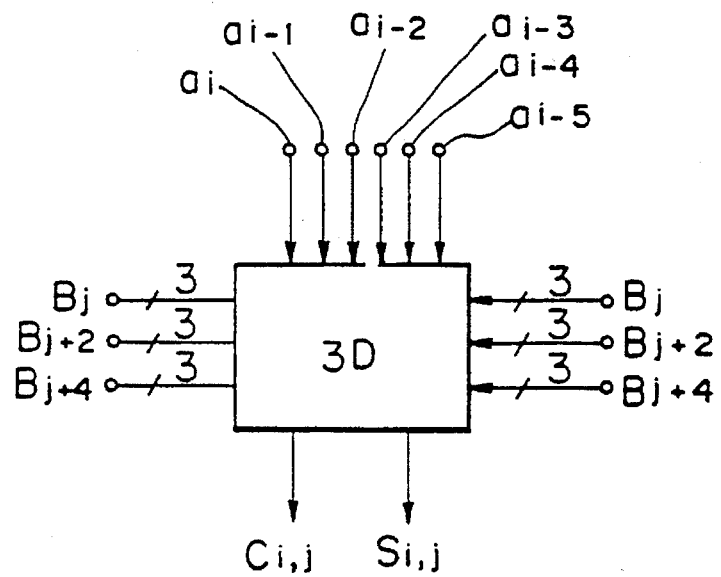
FIGS. 9A and 9B are block circuit diagrams of the block 3D of FIG. 7.
Figure 9B:
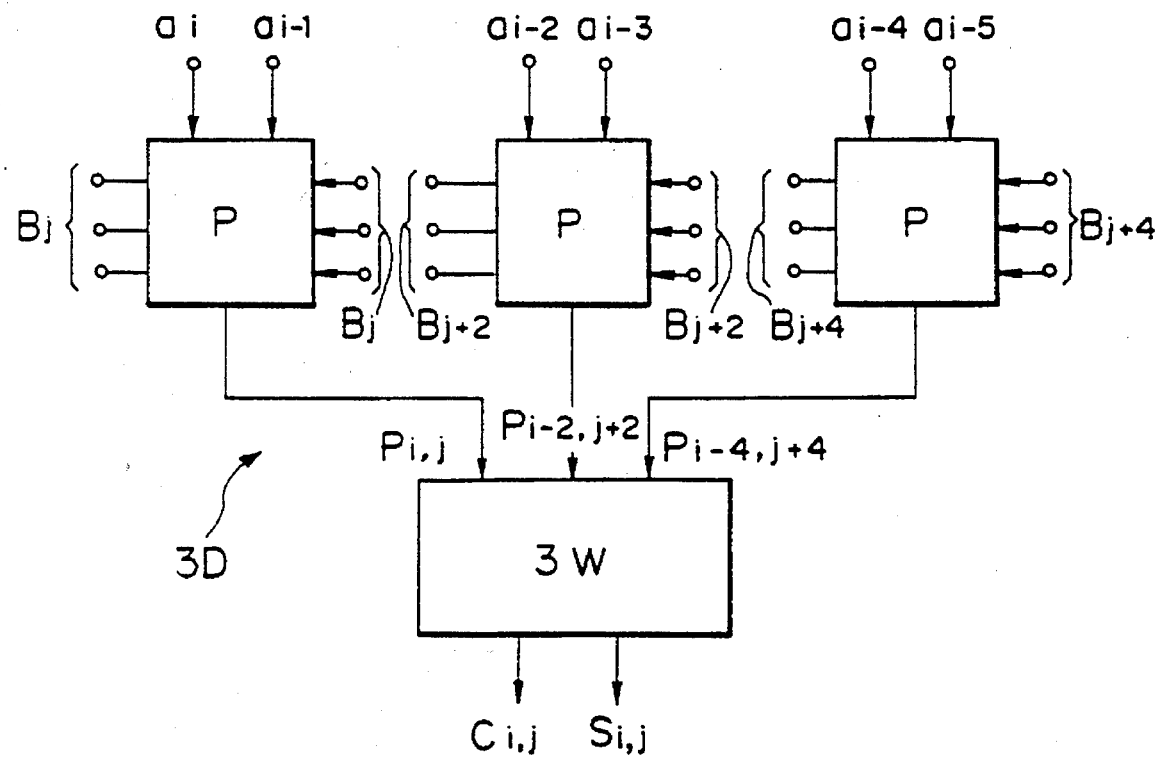
Figure 10:
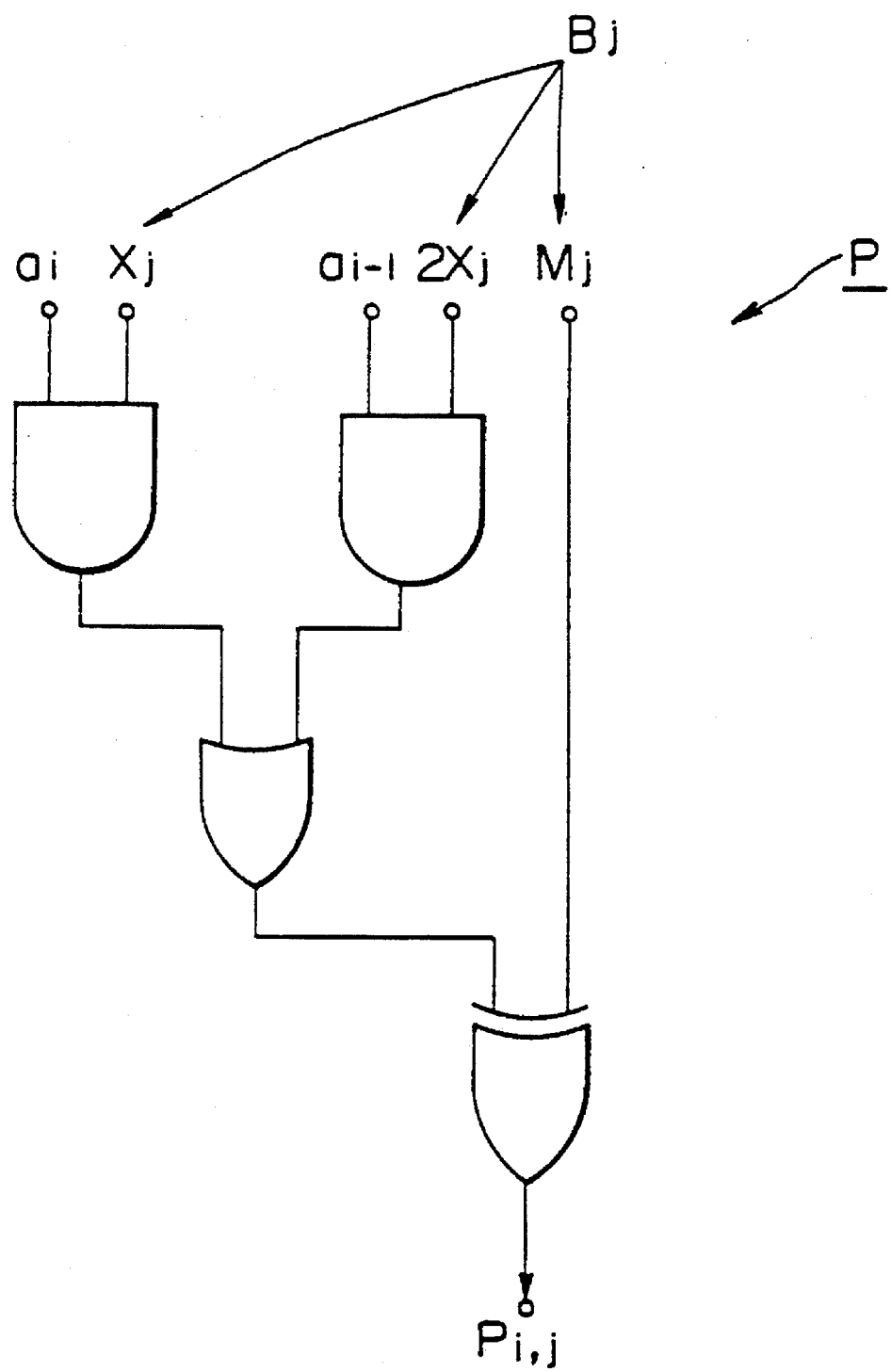
FIG. 10 is a block circuit diagram of the partial product generator P of FIGS. 8 and 9B.
Figure 11A:
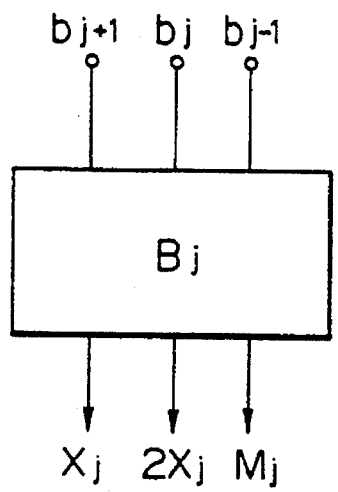
FIG. 11A is a block circuit diagram of the 2nd-order modified Booth decoder.
Figure 11B:
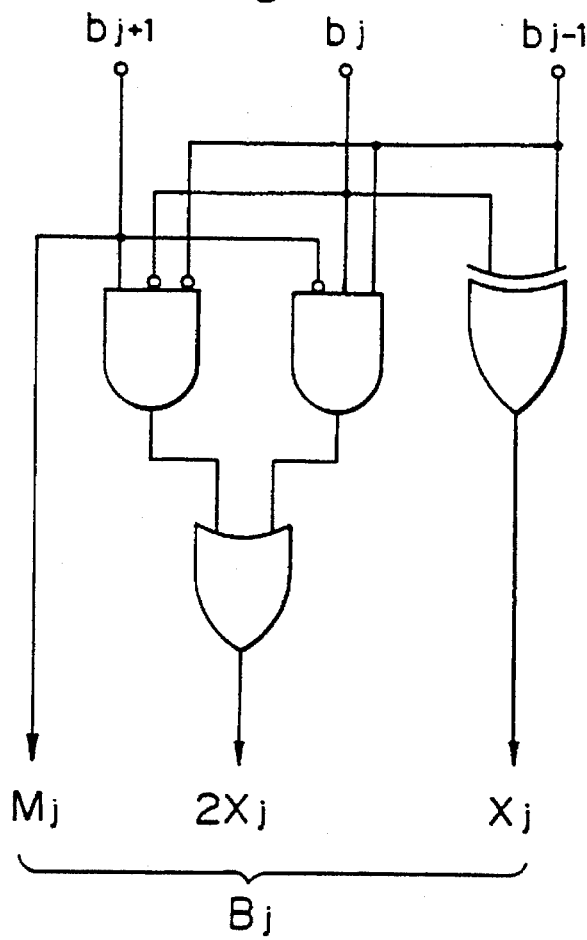
FIG. 11B is a logic circuit diagram of the 2nd-order modified Booth decoder.

An actual 22×22 bit multiplier using a 2nd-order modified Booth algorithm is illustrated in FIG. 7. In FIG. 7, REGX and REGY designate a multiplicand register for storing a multiplicand X defined by bits $a_0$ to $a_{21}$, and a multiplier register for storing a multiplier Y defined by bits $b_0$ to $b_{21}$. "3D" designates a block formed by three partial product generators P and a 3-input Wallace tree circuit 3W as illustrated in FIG. 8, and "5D" designates a block formed by three partial product generators P, 3-input Wallace tree circuit 3W and a 4-input Wallace tree circuit 4W, as illustrated in FIG. 8. Note that the 3-input Wallace tree circuit 3W and the 4-input Wallace tree circuit 4W of the block 5D serve as a 6-input adder. Also, the block 3D is illustrated in FIGS. 9A and 9B, and the partial product generator P is illustrated in FIG. 10. The Y decoder $B_j$ of FIG. 7, which is called a 2nd-order Booth decoder, is illustrated in FIGS. 11A and 11B.

Returning to FIG. 7, CPA designates a carry propagation adder.

As illustrated in FIG. 7, the entire multiplier is parallelogrammic, not rectangular, which create an empty area $E_1$ on the right bottom and an empty area $E_2$ on the left top, i.e., useless areas where circuit elements cannot be arranged are generated. The integration density of the entire multiplier is thereby reduced.

Figure 12A:
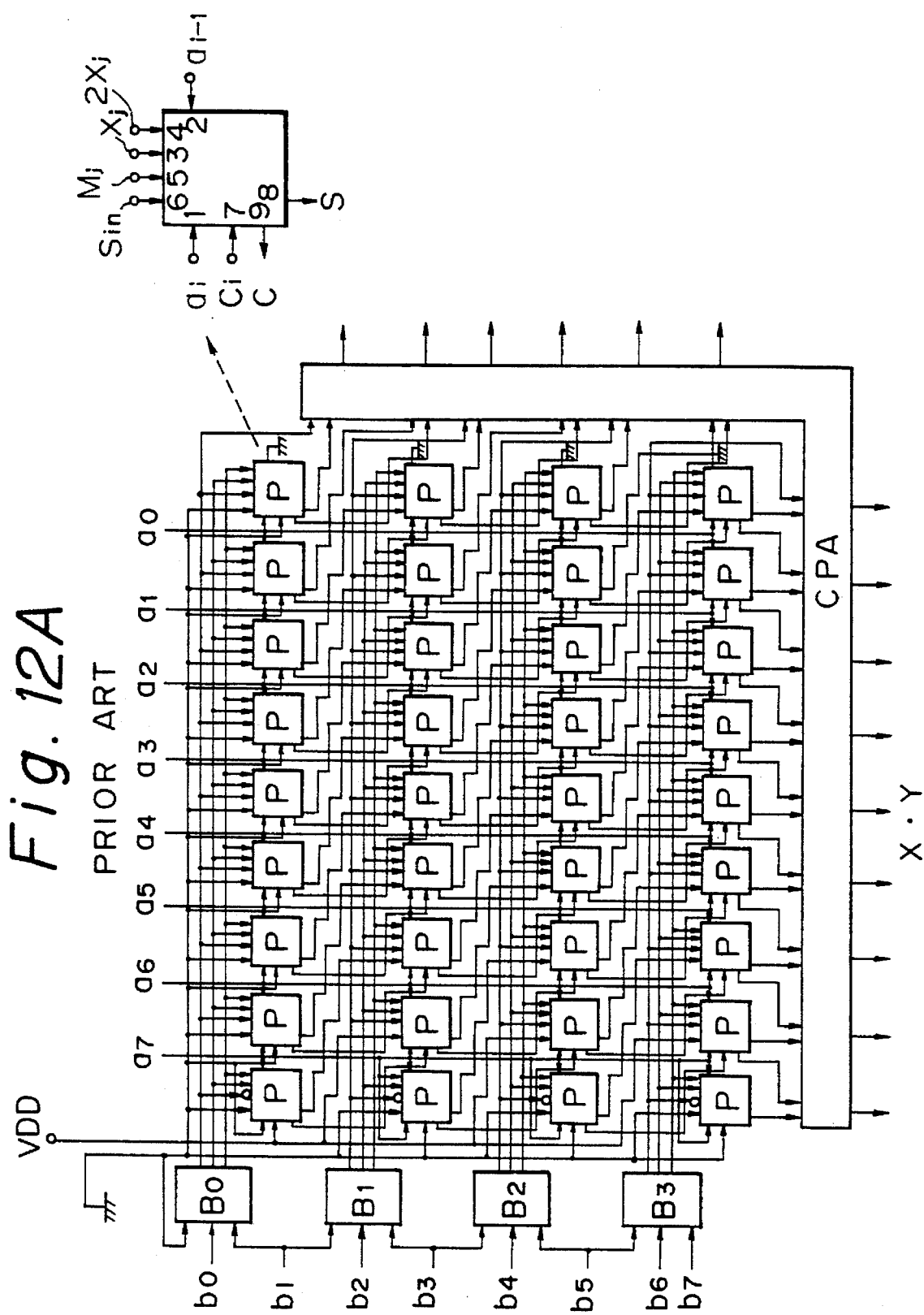
FIG. 12A is a block circuit diagram illustrating another prior art multiplier using a 2nd-order modified Booth algorithm.
Figure 12B:
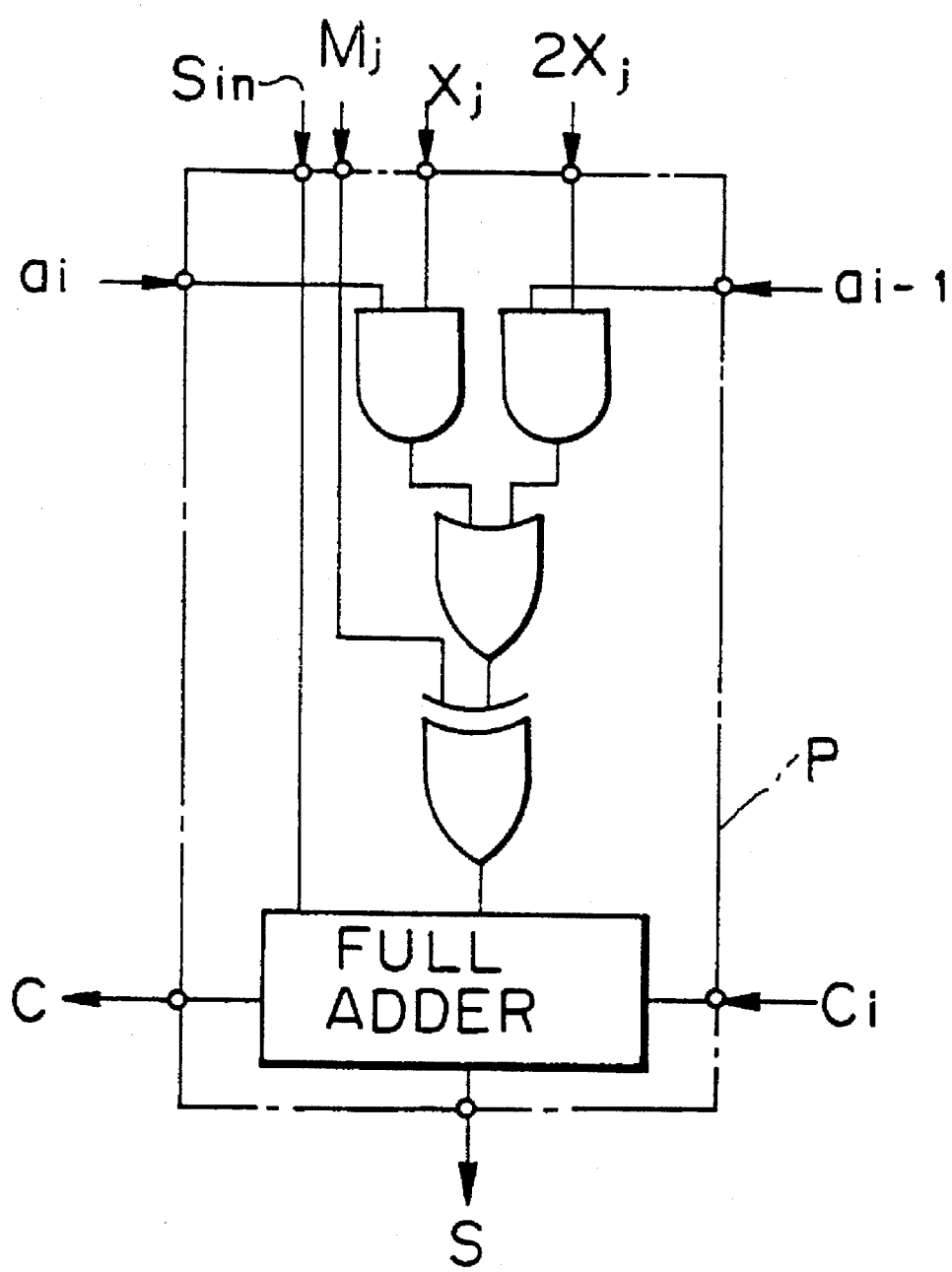
FIG. 12B is a logic circuit diagram of the partial product generator P with a full adder of FIG. 12A.

To avoid this, a convolution method is usually carried out, i.e., the circuit located at the bottom of the empty area $E_2$ is inserted into the empty area $E_1$, to make the entire multiplier rectangular. This process needs much desigue off. Another approach to the density of the multiplier block is illustrated in FIG. 12A as a modification of FIG. 6 (see: Japanese Laid-open Patent Publication No. 55-105732). In FIG. 12A, partial product generators P are connected by the carry save method. Correction terms are inputted as $V_{DD}$ to some basic cells, so that partial product generators for sign transmission are unnecessary to simplify the multiplier. Note that FIG. 12 illustrates one basic cell (P) composed of the partial product generators and a full adder in FIG. 12B.

In FIG. 12A, although the integration density of the entire multiplier can be improved using an iterative array of basic cells, the speed of the operation is low because of its CSA array structure. Note that the number of adders through which signals pass between the multiplicand register and the adder CPA is 4 at maximum.

On the other hand, if the adder array AA of FIG. 6 is constructed by a Wallace tree configuration, the Wallace tree configuration carries out an addition operation as illustrated in FIG. 13A, where an 8×8 bit multiplication using a 2nd-order modified Booth algorithm is shown. In FIG. 13A, $Z_0$ to $Z_8$ designate partial products, $S_0$ to $S_3$ designate correction terms for negative numbers, and "1" designates a correction term for signs. A final product X·Y is represented by $Z_0$ to $Z_{14}$, and the maximum significant bit $Z_{14}$ designates a sign. In this case, the number of inputs to a Wallace tree circuit is 5 at maximum, and therefore, a Wallace tree configuration as illustrated in FIG. 13B is adopted. That is, a 5-input adder is realized by a 6-input Wallace tree circuit 6W where one input is fixed at "0". By using such a Wallace tree configuration, the number of adders through which signals pass between the multiplicand register and the adder CPA is 3 at maximum, thereby improving the speed of the operation compared to the multiplier of FIG. 12A.

Figure 14:
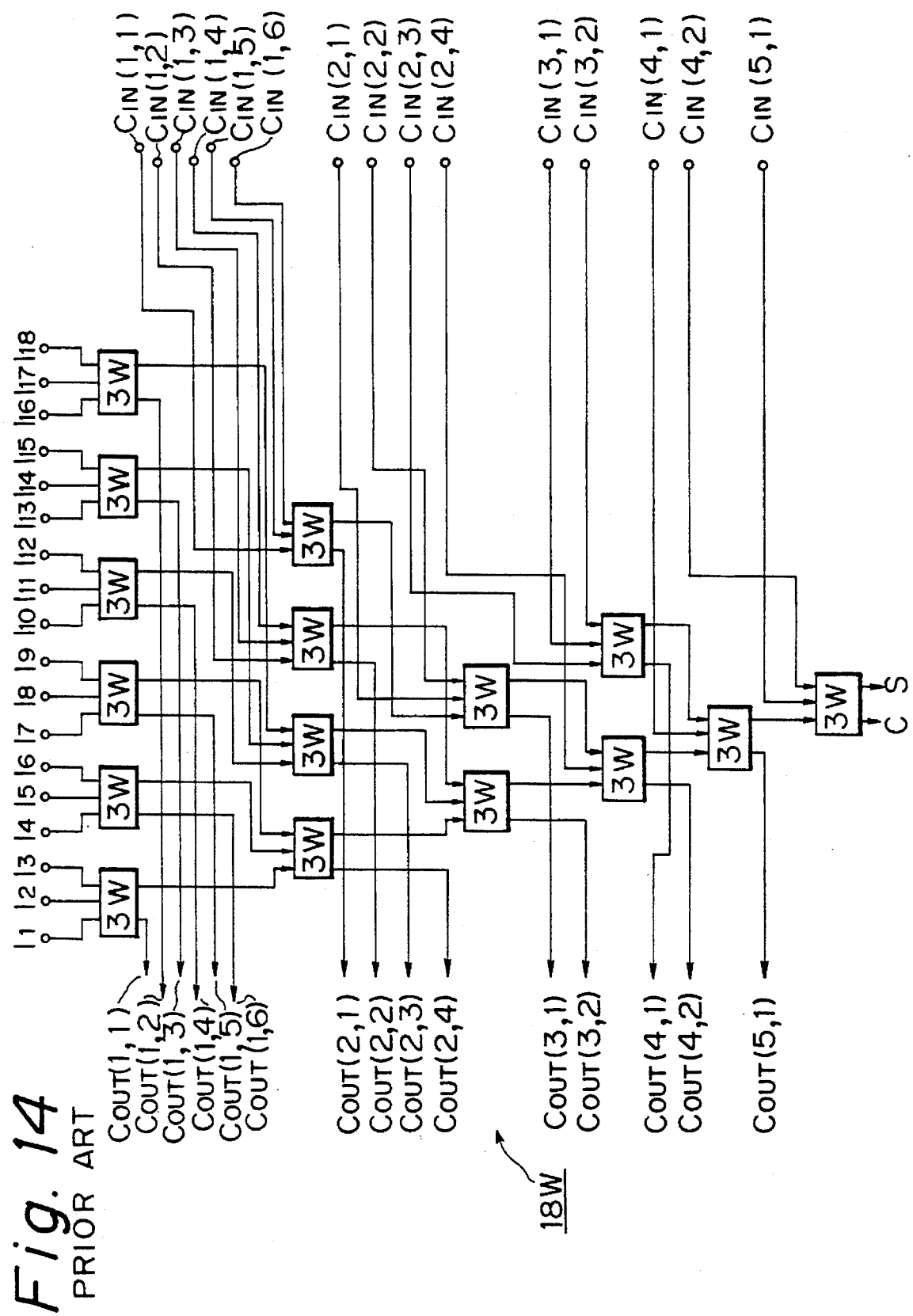
FIG. 14 is a block circuit diagram of an 18-input Wallace tree circuit.

In the above-mentioned Wallace tree configuration, however, the circuit is not regular, and therefore, it is difficult to design. Particularly, when designing a multiplier for multibit data of 8×8 bits or more, the impact of the above-mentioned design problem is large. For example, as illustrated in FIG. 14, an 18-input Wallace tree circuit 18W has a large number of connections between full adders (3-input Wallace tree circuit 3W) and partial product generators which generate input signals to the 18A in addition to other connections $C_{IN}(1, 1)$, $C_{IN}(1, 2)$, ..., $C_{OUT}(1, 1)$, $C_{OUT}(1, 2)$, ... between the 18-input Wallace tree circuits 18W. Note that $C_{IN}(1, 1)$, $C_{IN}(1, 2)$, ... designate carry-in signals from the lower bit position, and $C_{OUT}(1, 1)$, $C_{OUT}(1, 2)$, ... designate carry-out signals for the higher bit position.

Figure 15A:
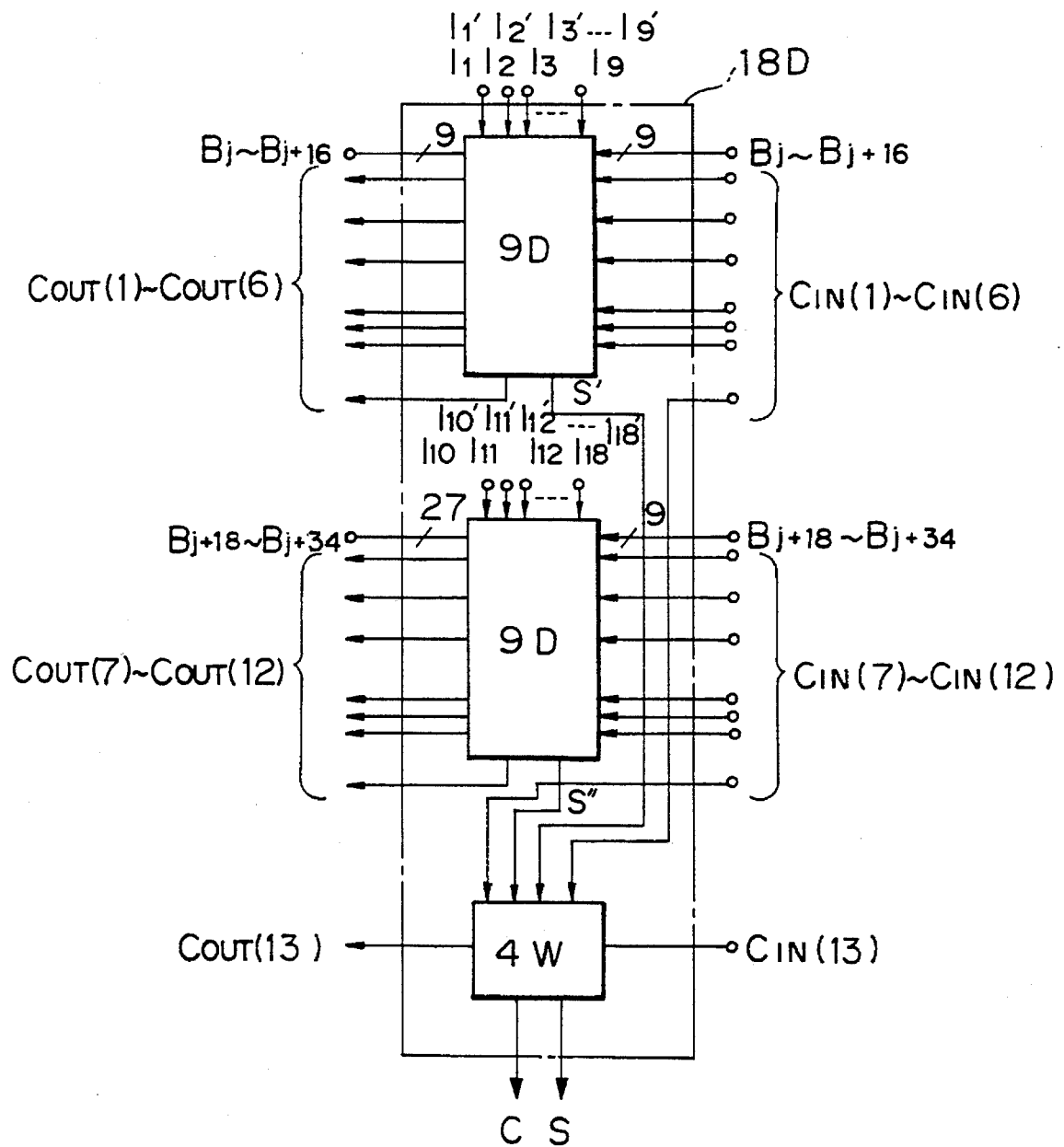
FIGS. 15A and 15B are block circuit diagrams for explaining the principle of the present invention.
Figure 15B:
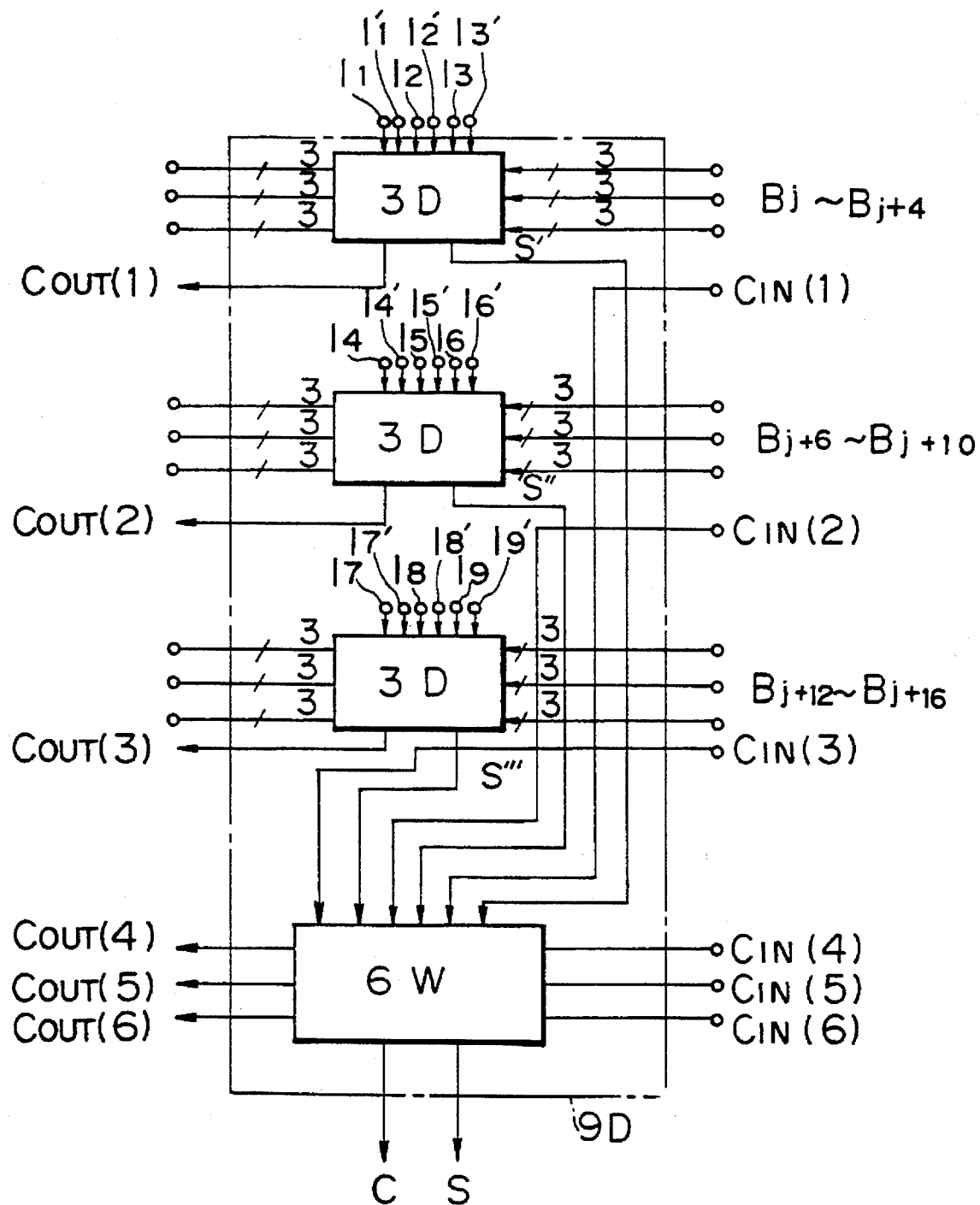

According to the present invention, instead of a multi-input Wallace tree circuit such as the 18-input Wallace tree circuit 18W of FIG. 14, partial product generators including the 18-input Wallace tree circuit 18W of FIG. 14 are replaced by a block 18D formed by two blocks 9D and a 4-input Wallace tree circuit 4W, as illustrated in FIG. 15A. Note that the block 9D is formed by three blocks 3D and a 6-input Wallace tree circuit 6W, as illustrated in FIG. 15B, and that in the present invention, use is made of the repetition of small scale circuits, to simplify the layout of the multiplier, and also to increase the speed of the operation.

Figure 16:
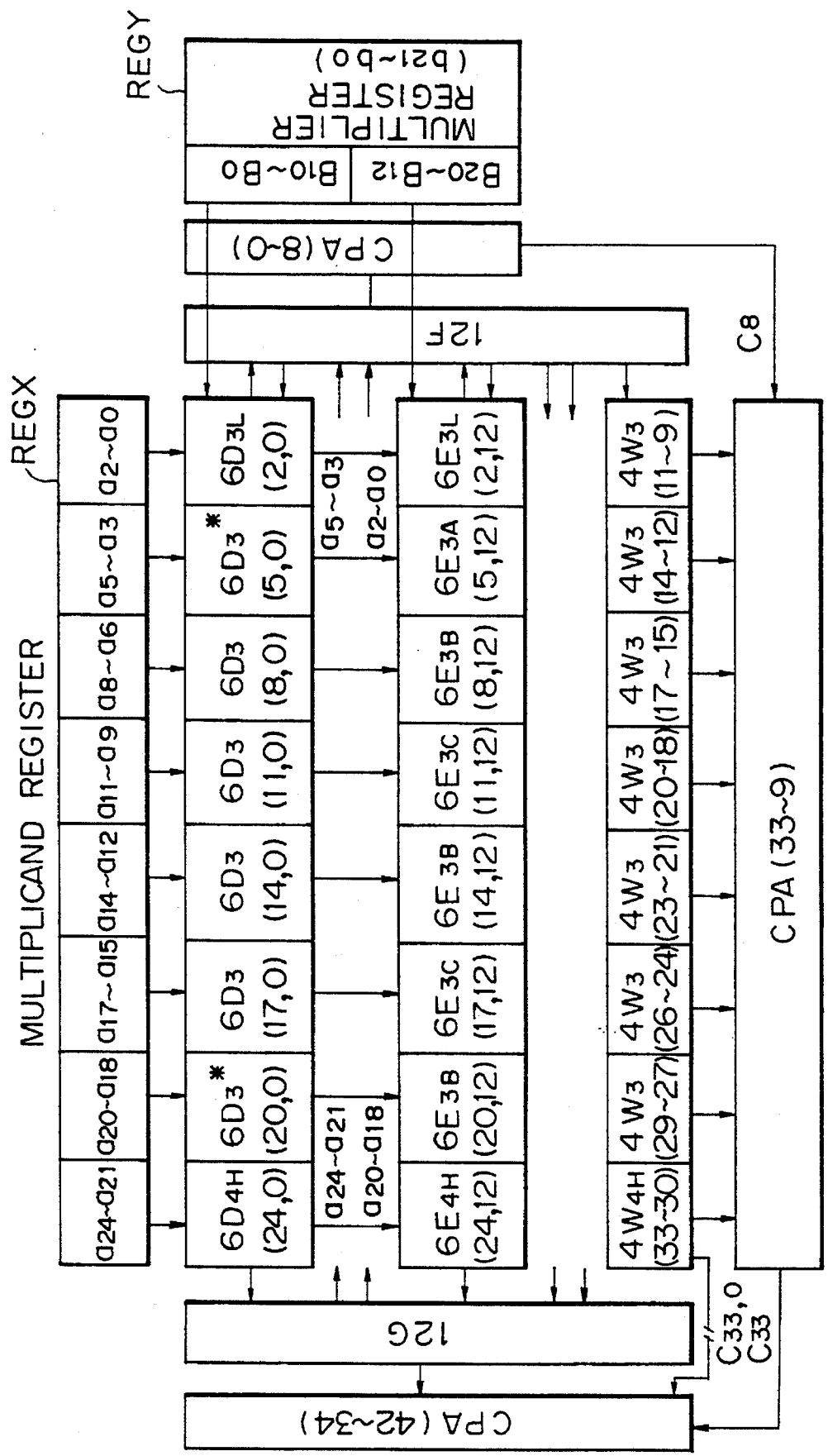
FIG. 16 is a block circuit diagram illustrating an embodiment of the multiplier according to the present invention.

In FIG. 16, which illustrates an embodiment of the multiplier according to the present invention, the multiplier is formed by blocks $6D_3$, $6D_3^*$, $6D_{3L}$, $6D_{4H}$, $6E_{3A}$, $6E_{3B}$, $6E_{3C}$, $6E_{3L}$, $6E_{4H}$, $4W_3$, 12G, 12F, and a circuit CPA (carry propagation type adder circuit). Note that references $B_0$ to $B_{20}$ designate Y decoders for a 2nd-order modified Booth algorithm. Hereinafter, the details of the multiplier of FIG. 16 will be explained with reference to FIGS. 17 through 27.

Figure 17A:
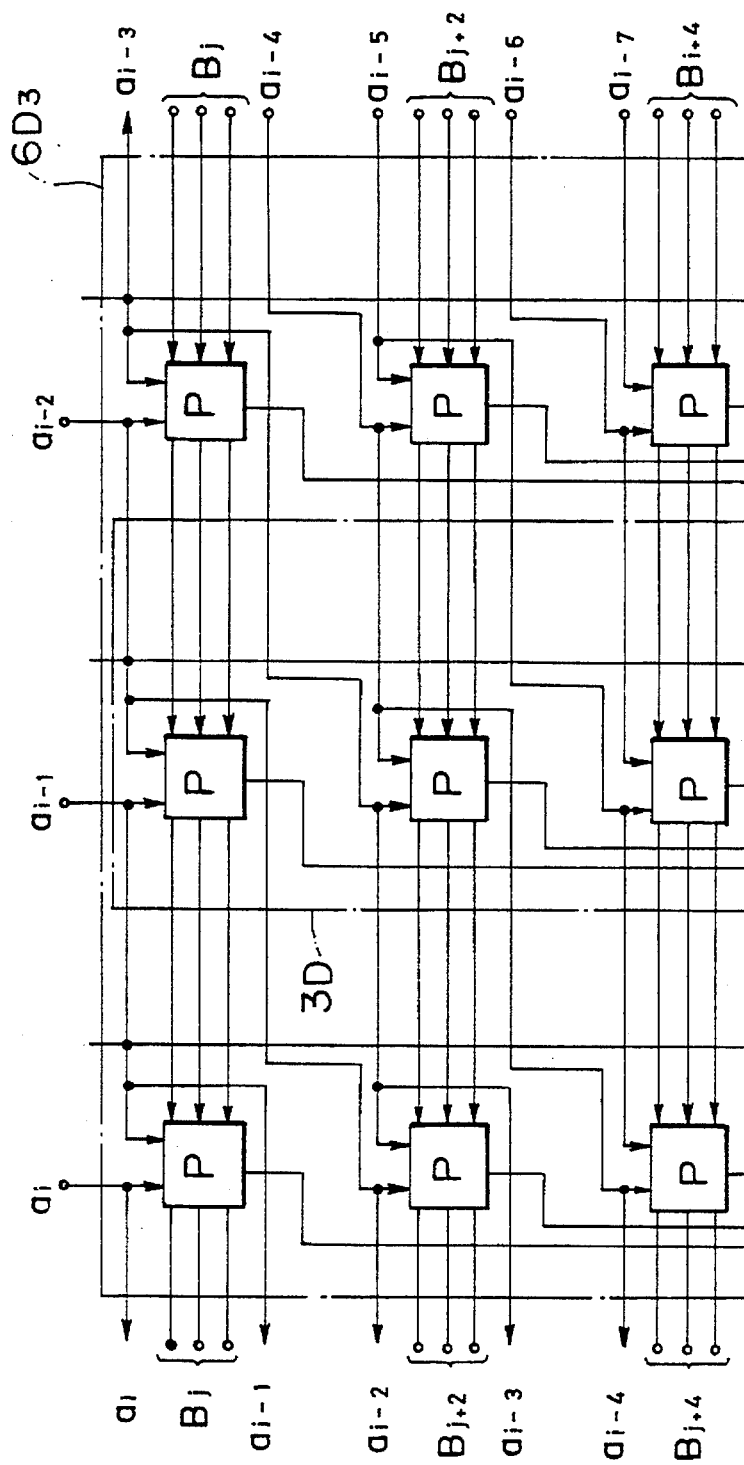
Figure 17B:
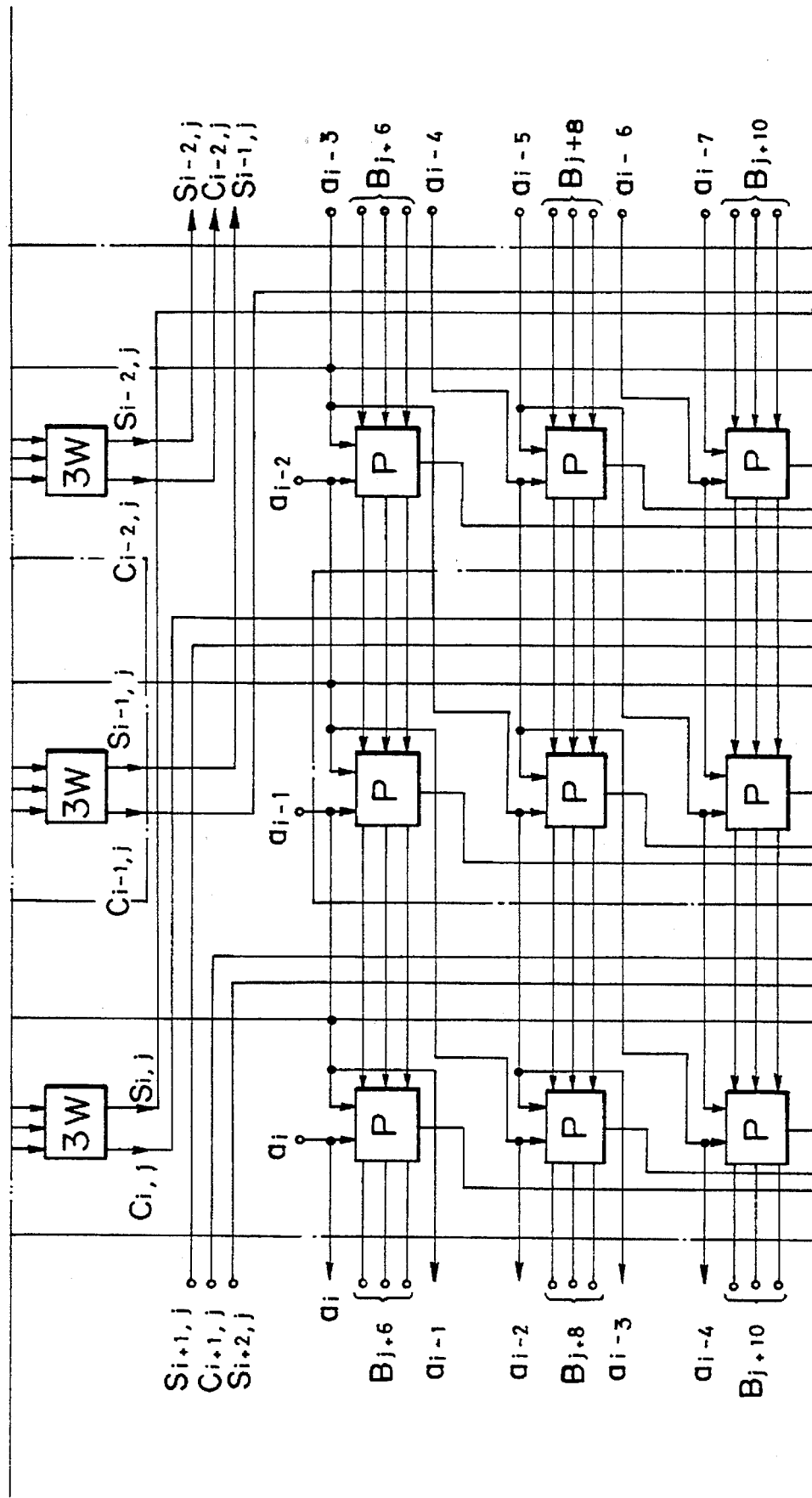
Figure 17C:
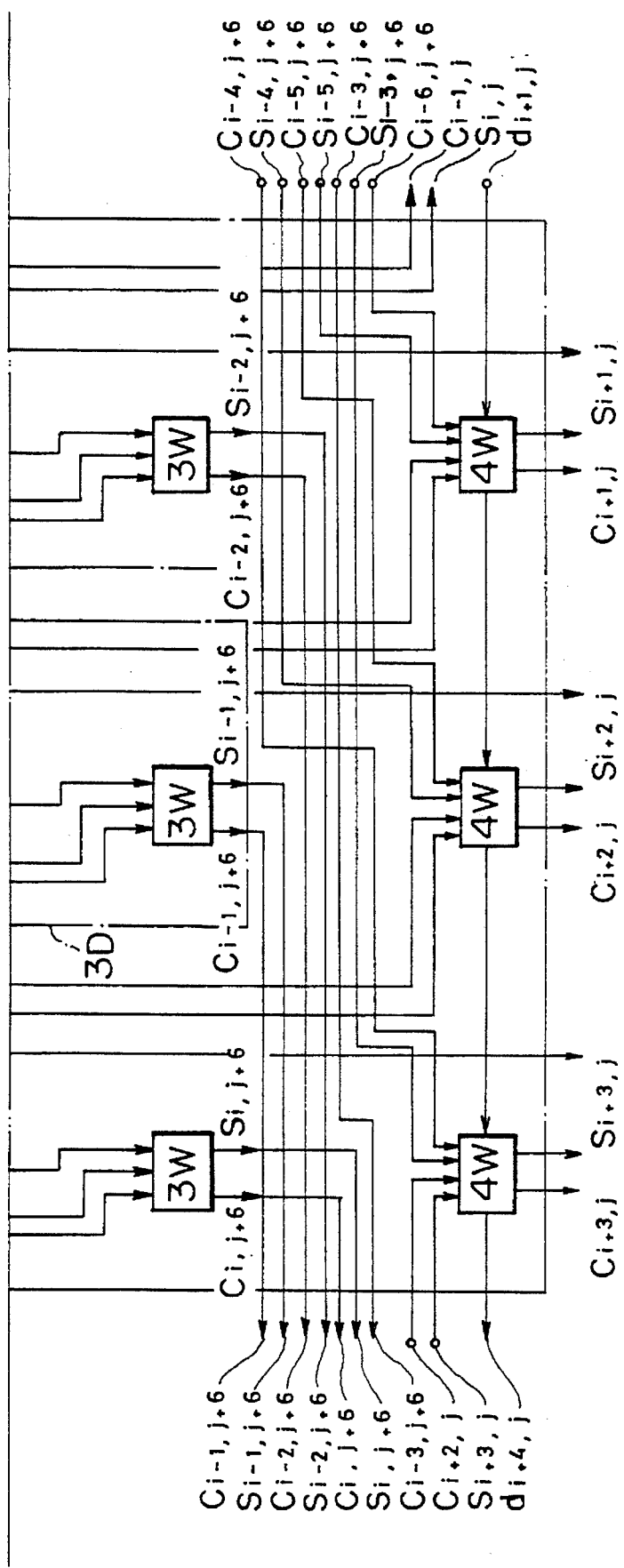
Figure 18:
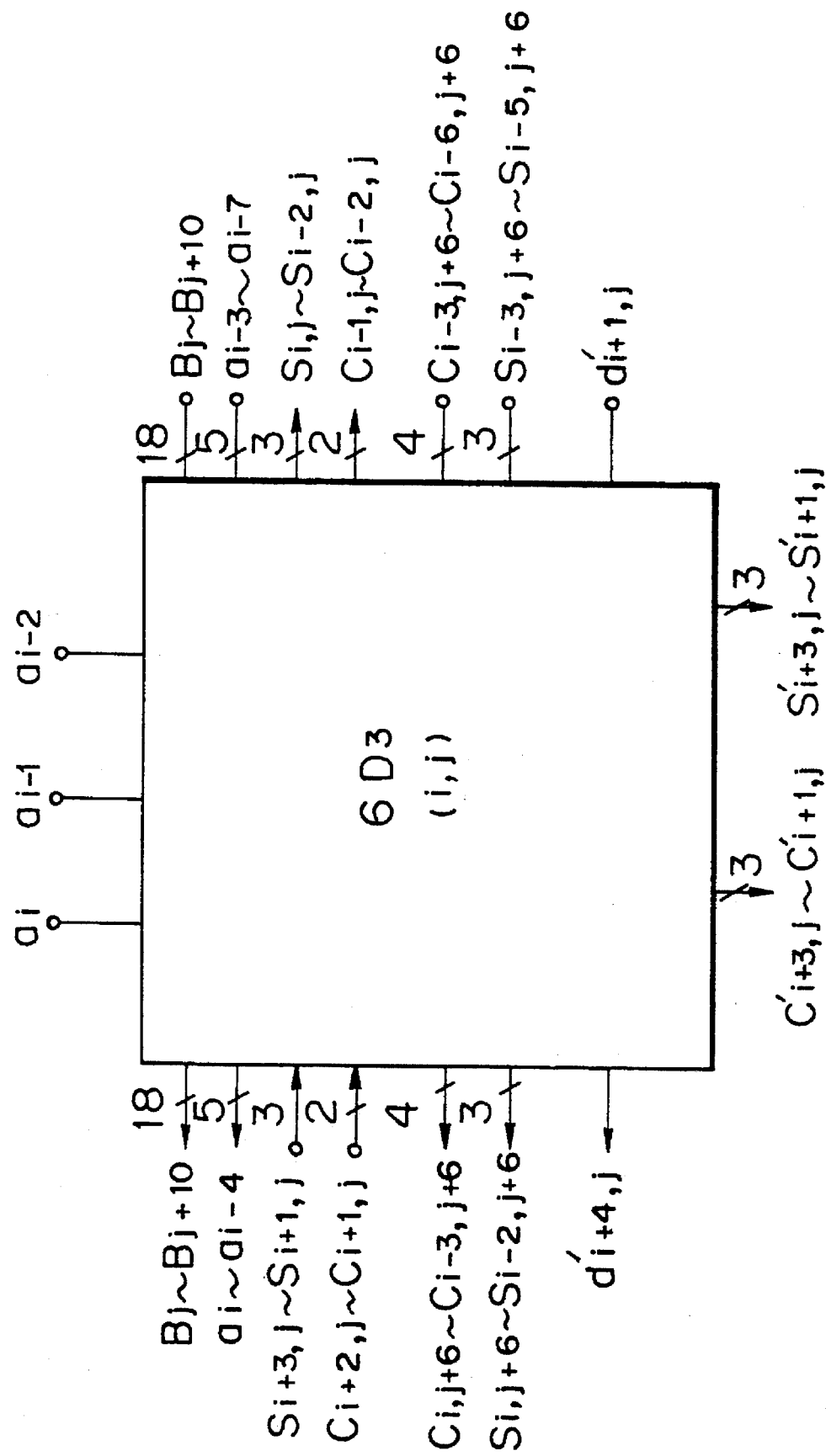
FIG. 18 is a diagram of the symbols of the block $6D_3$ of FIG. 16;
}

In FIG. 17, which is a detailed block circuit diagram of the block $6D_3$ of FIG. 16, three columns (i.e., three bits of the multiplicand) are illustrated. In FIG. 17, the sum signal S of the upper side block 3D is extended by three bits in the right direction, i.e., in the opposite direction to the propagation direction of the multiplicand, and is input to the corresponding 4-input Wallace tree circuit 4W.

The carry signal C of the upper side block 3D is shifted by two bits in the right direction, i.e., in the opposite direction to the propagation direction of the multiplicand, and is input to the corresponding 4-input Wallace tree circuit 4W. The sum and carry signals of the lower side block block 3D are shifted by three and four bits, respectively, in the left direction. As a result, a combination of multiplicand bits such as $a_{i-7}$, $a_{i-6}$, ..., $a_i$ are common to the upper block 3D and the lower block 3D.

That is, although the multiplicand signals applied to the 3D blocks in the same column flow from the right upper side to the left lower side in the same way as in FIG. 8, the multiplicand signals are not transferred between the blocks belonging to different columns.

Therefore, the block $6D_3$ forms a basic block for a multiplier. Most of the multiplier of the present invention can be easily designed by repeating the block $6D_3$ which is summarized in FIG. 18. Therefore, because of the correspondence between the logic and the layout, it is easy to simplify the design of a multiplier.

The block $6D_3^*$ is a modification of the block $6D_3$. That is, in the block $6D_3^*$, two signals $a_{i-6}$ and $a_{i-7}$ supplied to the partial product generators P located on the right side of the block $6D_3$ are fixed at "0".

Figure 19B:
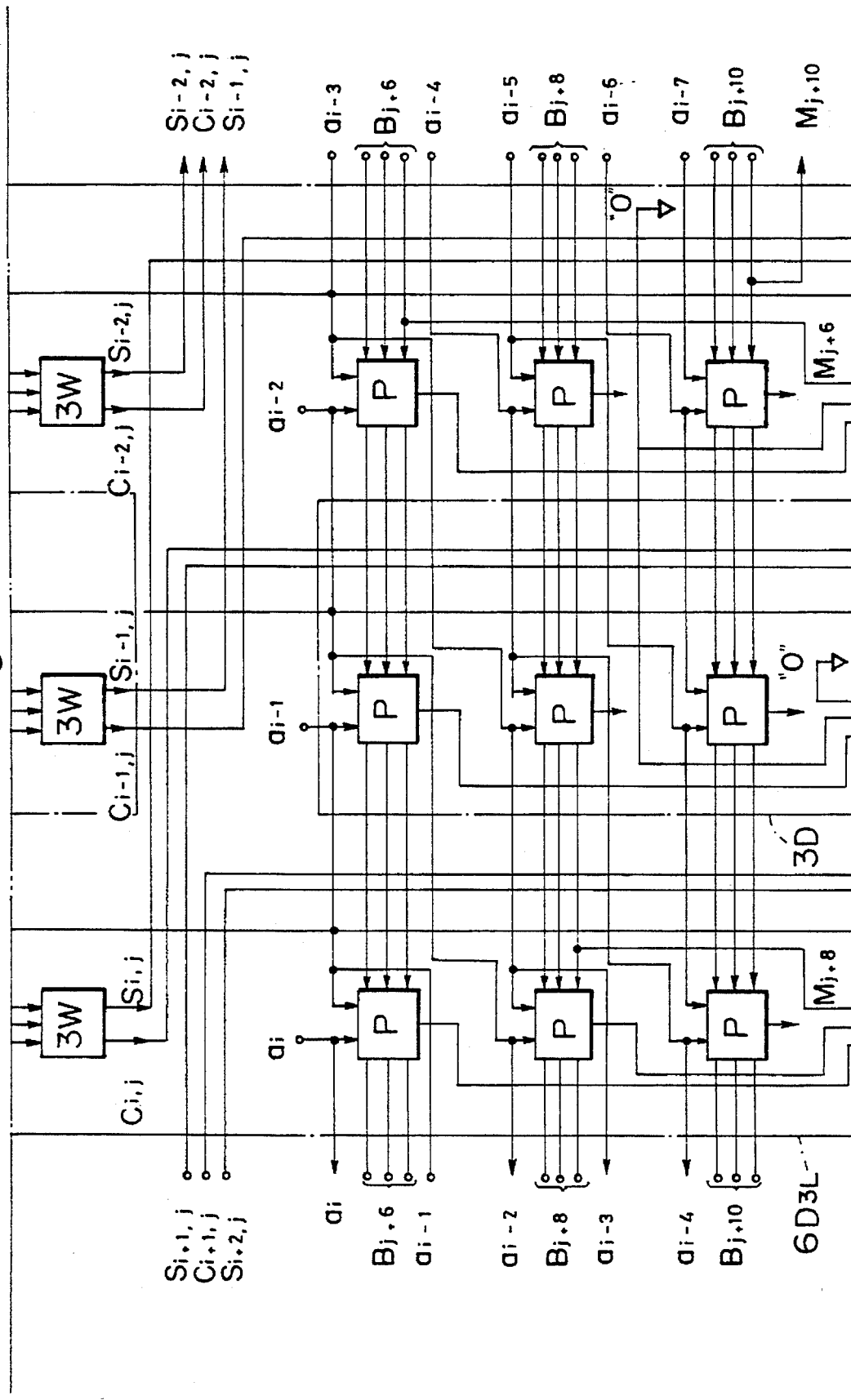
Figure 19C:
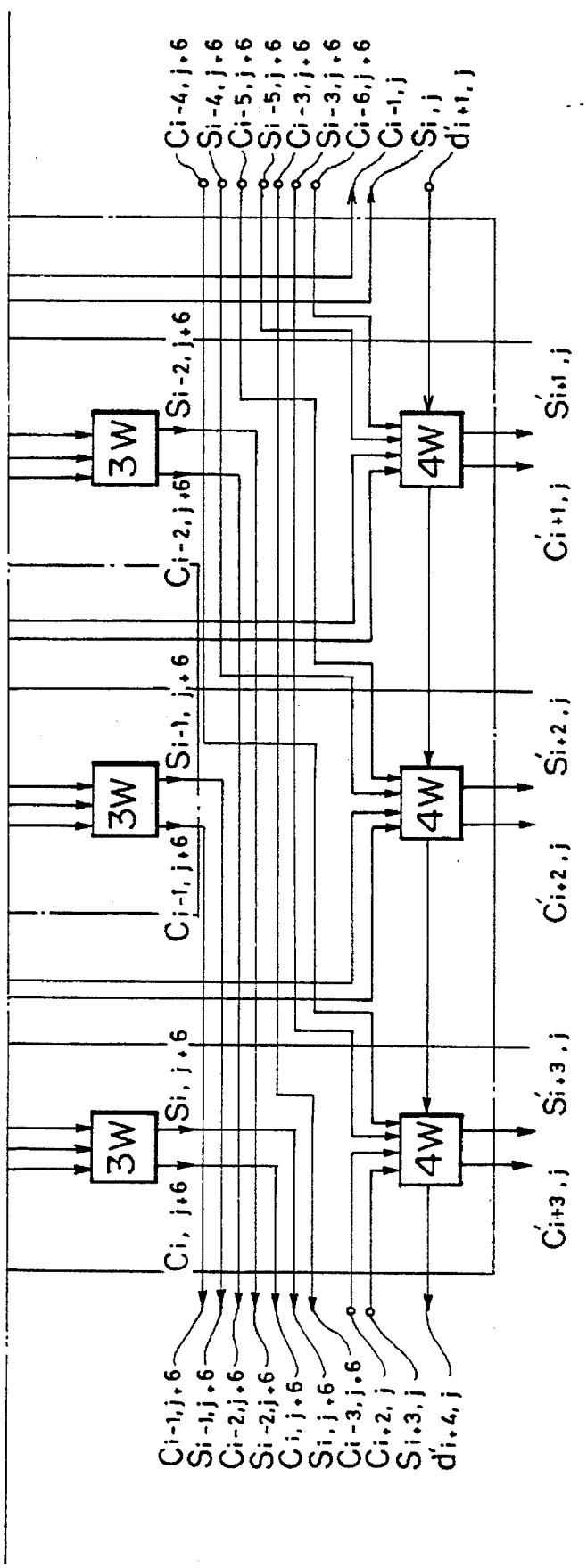

In FIG. 19, which is a detailed block circuit diagram of the block $6D_{3L}$ of FIG. 16, this block $6D_{3L}$ is used for processing the least significant bit. In FIG. 19, a modification is added to the block $6D_3$ of FIG. 17, to add +1 to the addition result when a decoding result by a 2nd-order Booth decoder is negative.

Figure 20A:
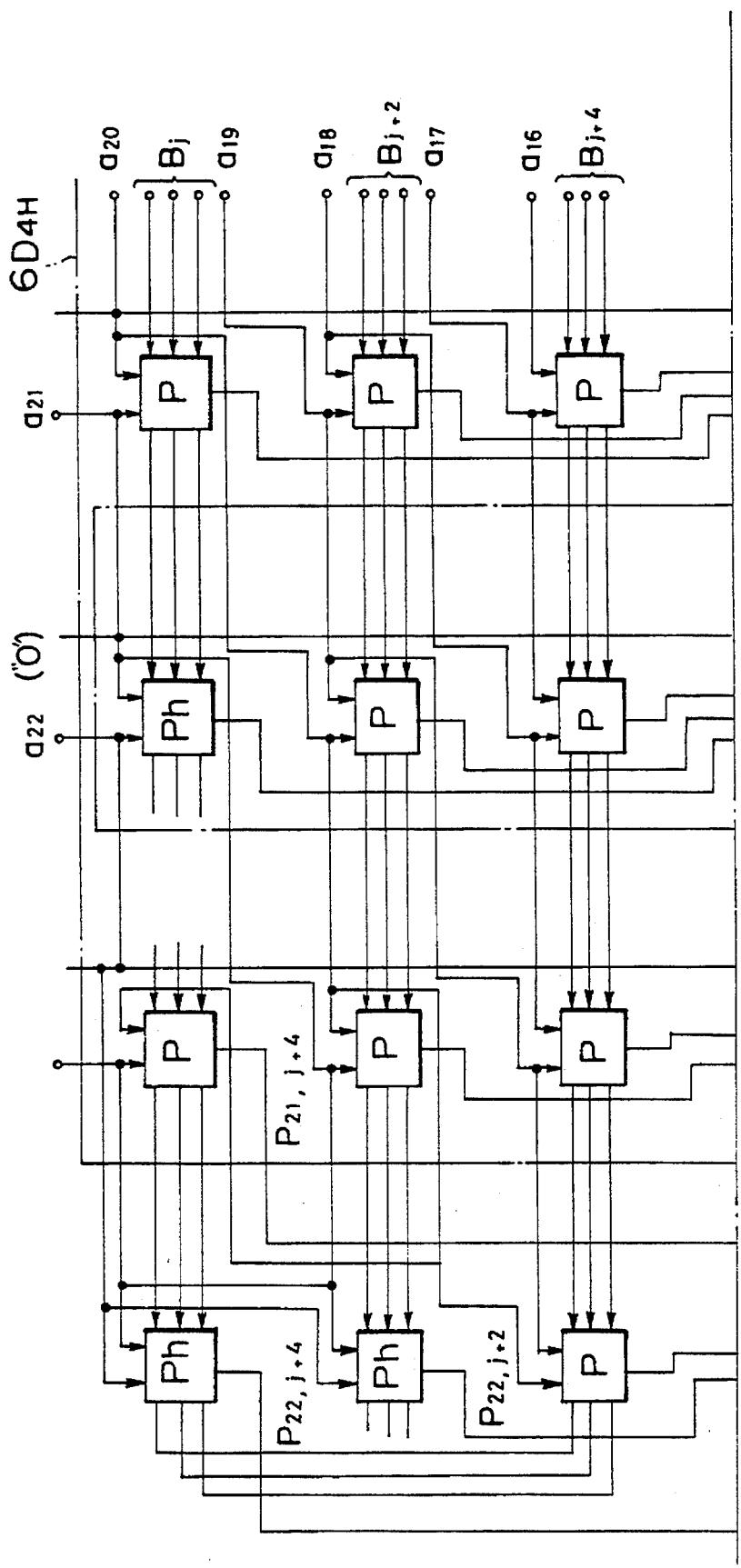
Figure 20B:
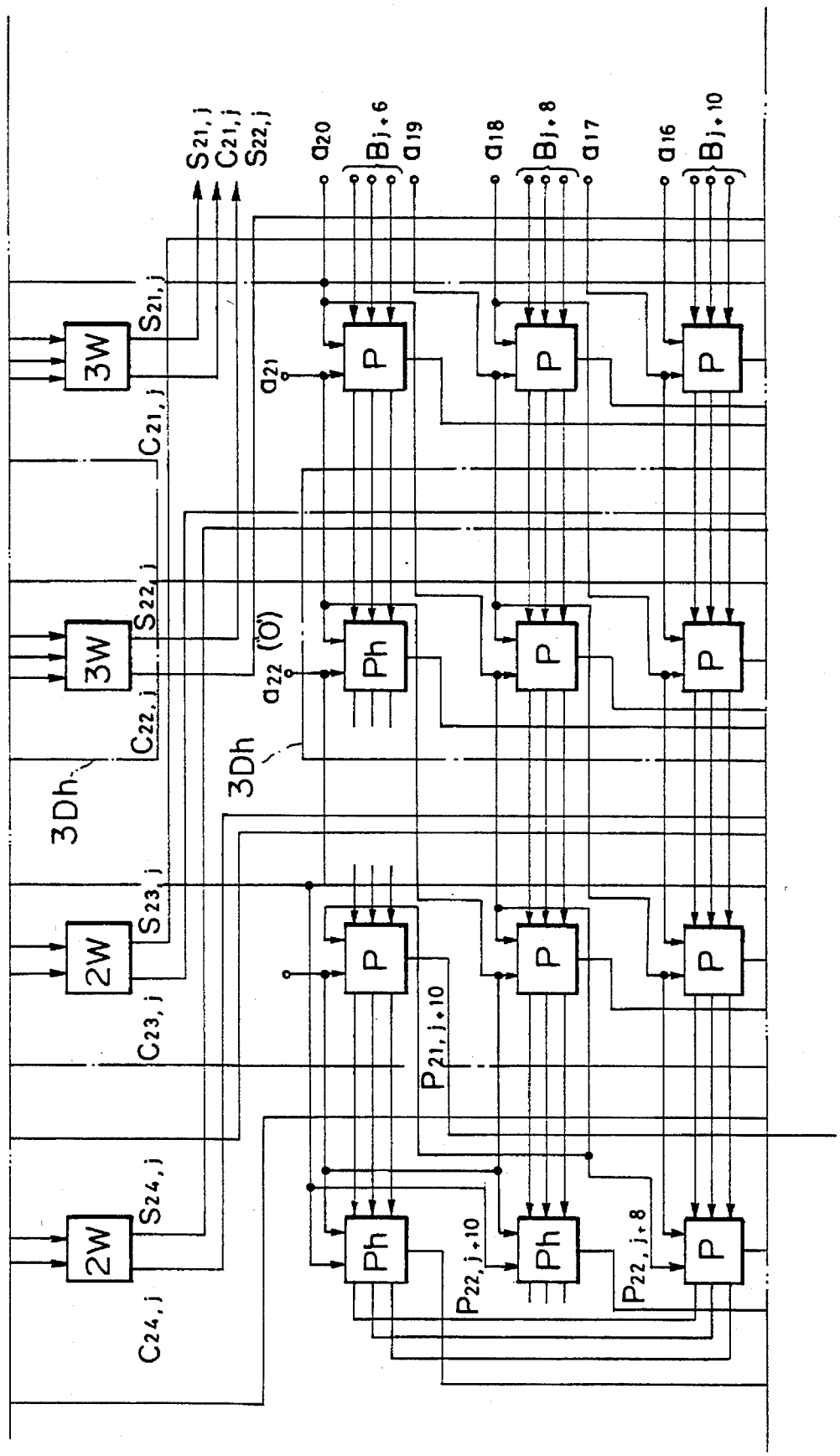
Figure 20C:
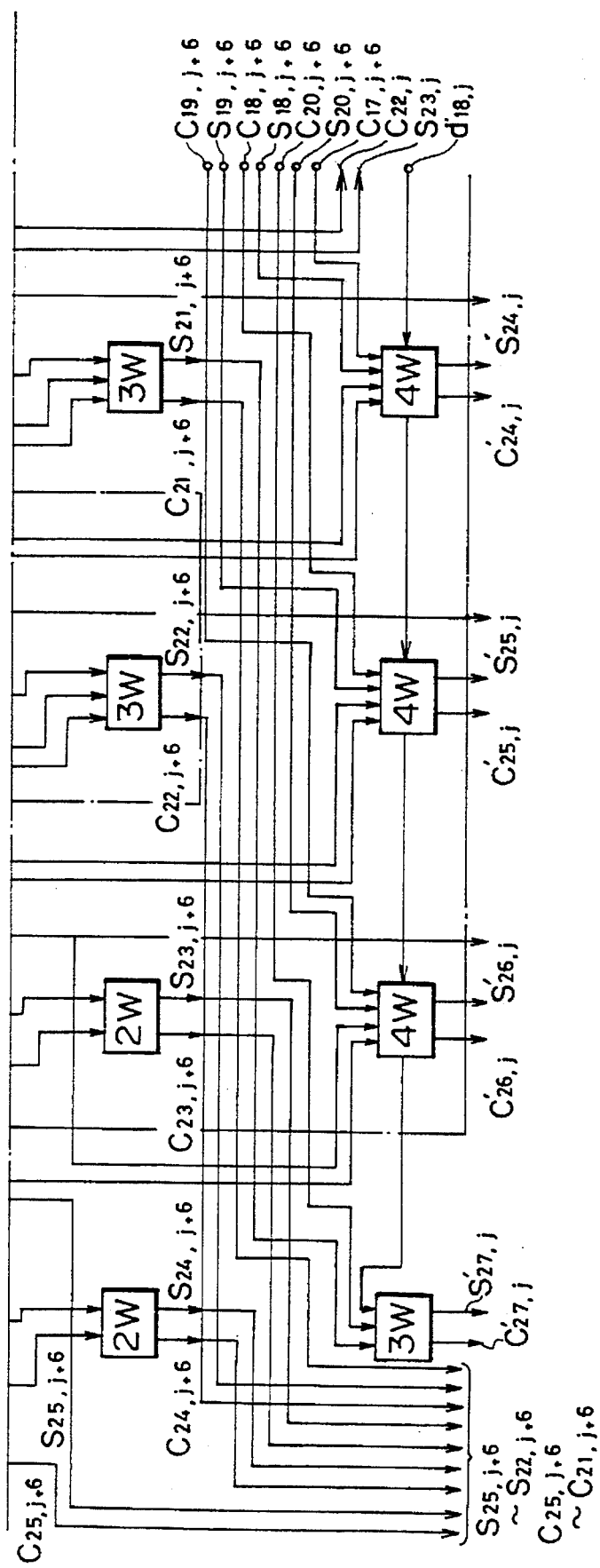
Figure 21A:
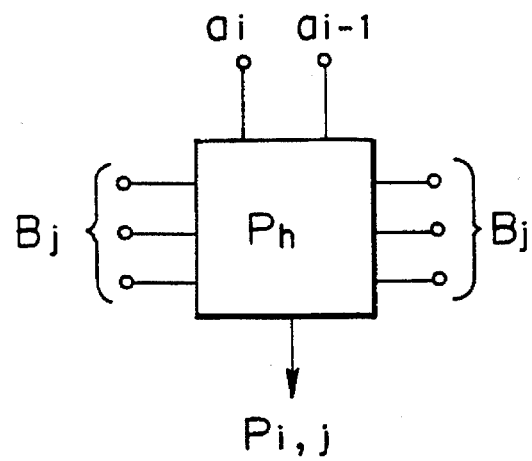
FIG. 21A is a diagram of the symbols of the block $P_h$ of FIG. 16.
Figure 21B:
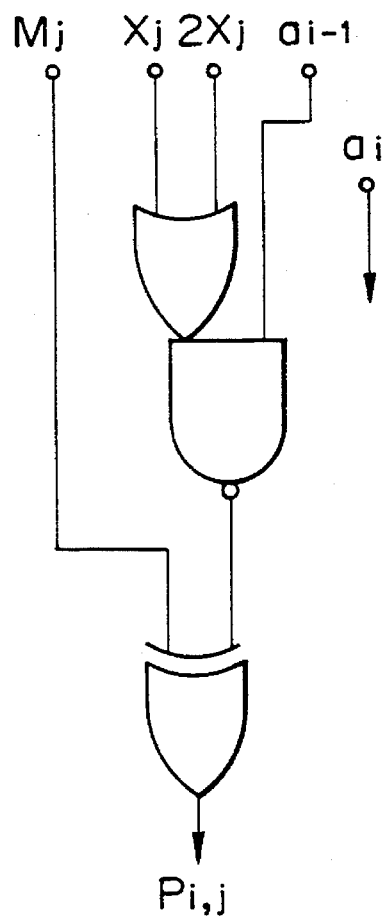
FIG. 21B is a logic circuit diagram of the block $P_h$ of FIG. 16.
Figure 22A:
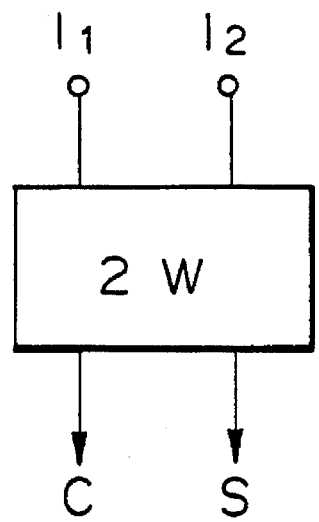
FIG. 22A is a diagram of the symbols of the 2-input Wallace tree circuit 2W of FIG. 16.
Figure 22B:
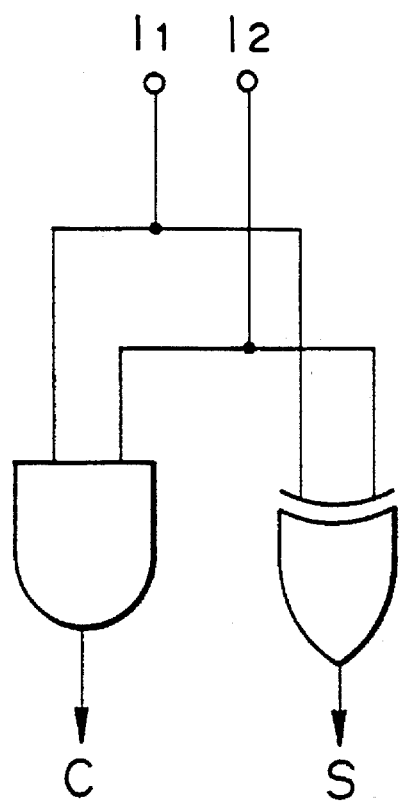
FIG. 22B is a logic circuit diagram of the 2-input Wallace Tree circuit 2W of FIG. 16.

In FIG. 20, which is a detailed block circuit diagram of the block $6D_{4H}$ of FIG. 16, this block $6D_{4H}$ is used for processing the most significant bit. In FIG. 20, a modification is added to the block $6D_3$ of FIG. 17, to process a sign in accordance with a decoding result by a 2nd-order Booth decoder. Note that a block $P_h$ is represented by FIG. 21A and is constructed as shown in FIG. 21B. Also, a 2-input Wallace tree circuit 2W is represented by FIG. 22A and is constructed as shown in FIG. 22B.

Figures 23, 23A:
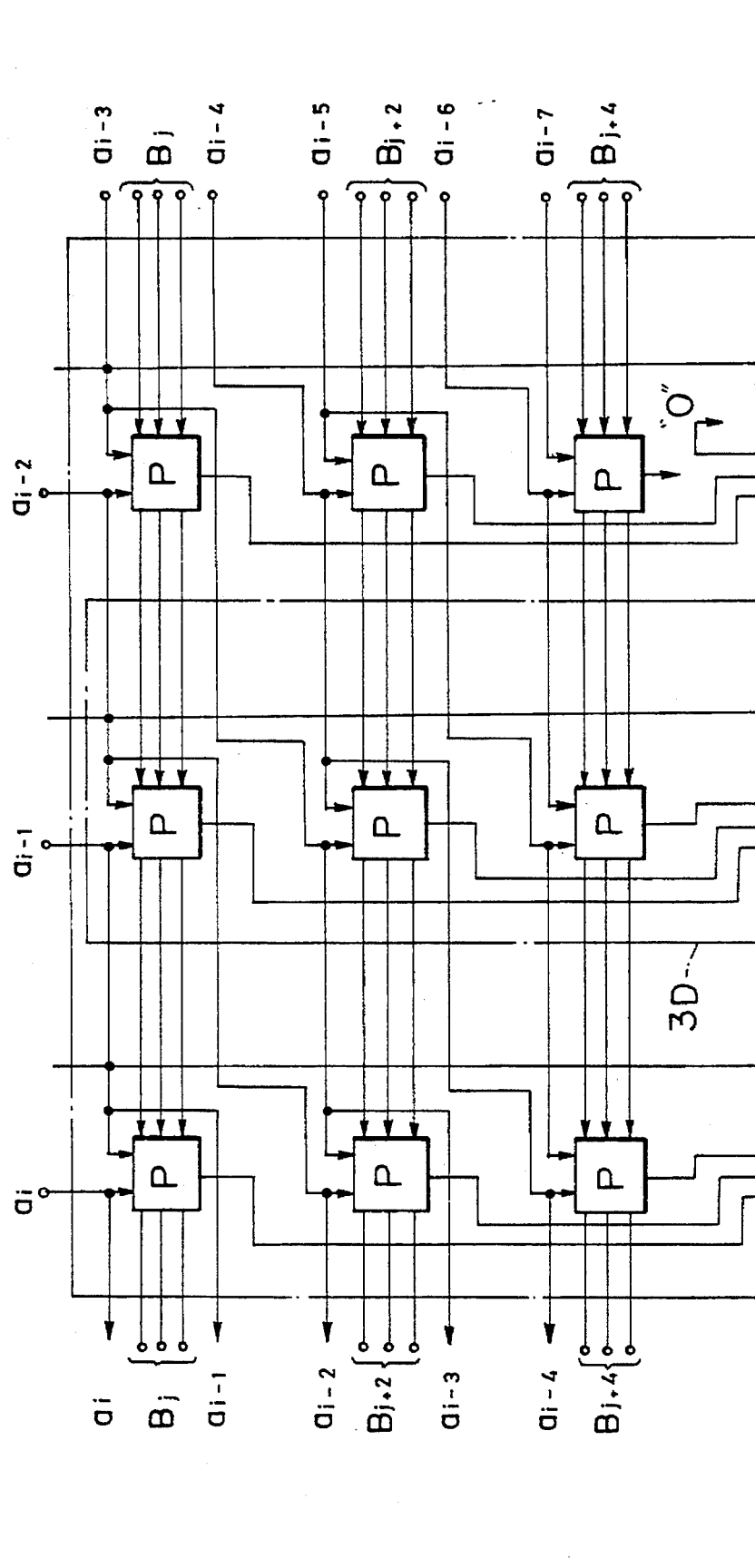
FIG. 23, 23A, 23B and 23C are a block circuit diagram of the block $6E_{3A}$ of FIG. 16.
Figure 23B:
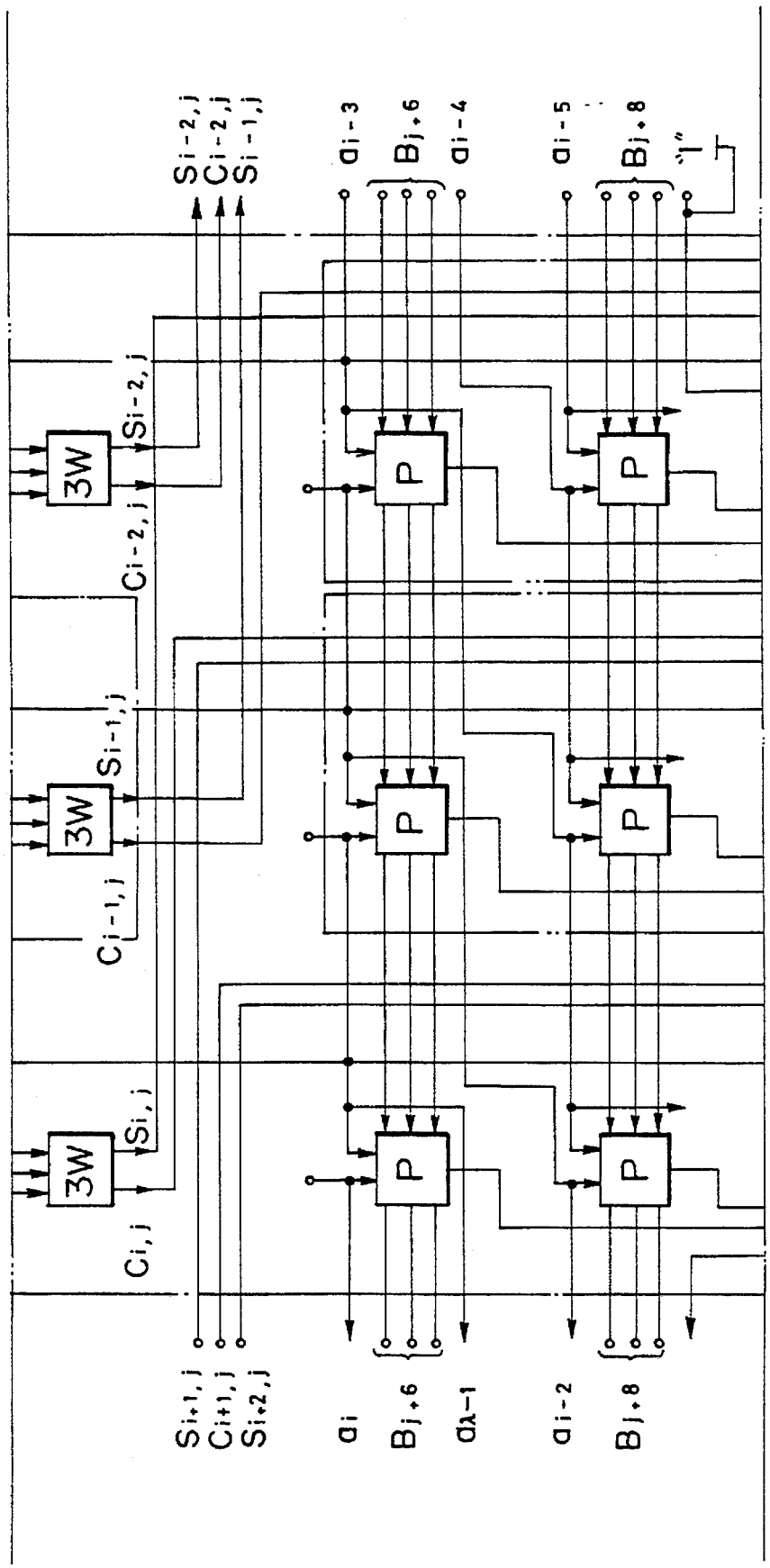
Figure 23C:
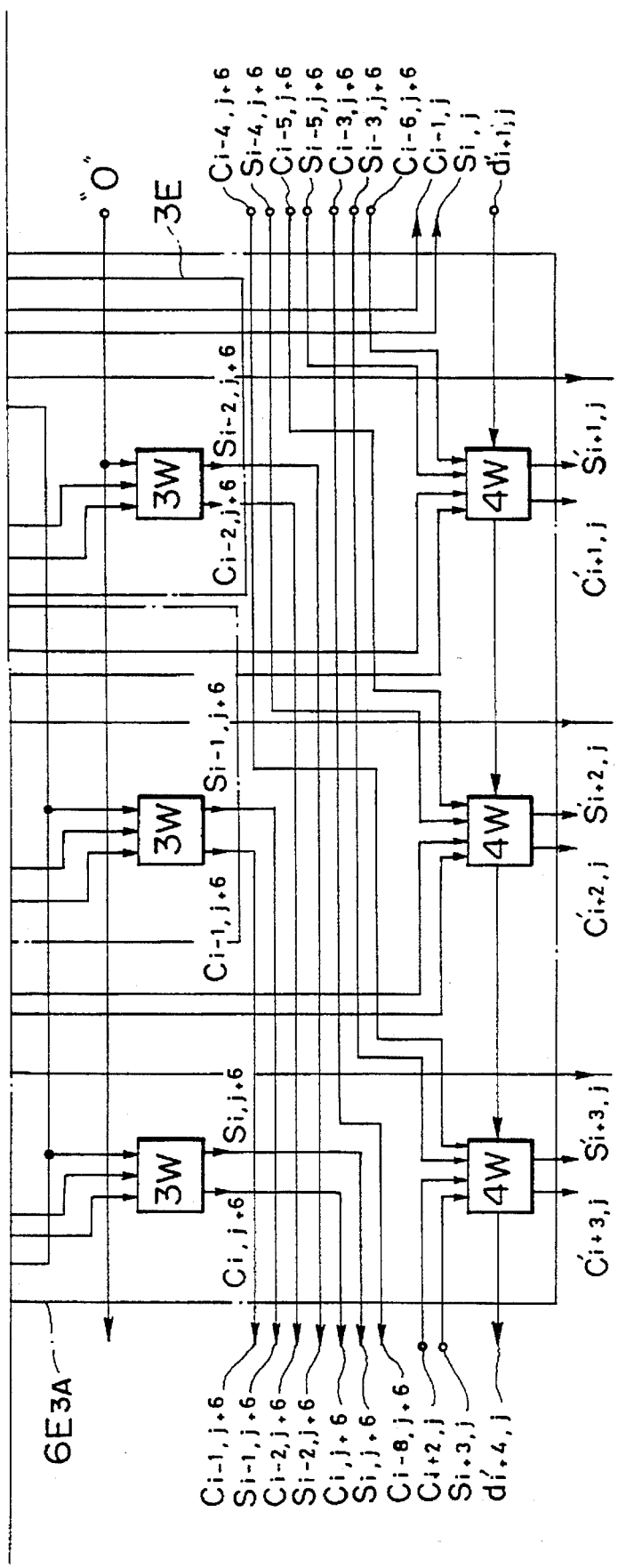

In FIG. 23, which is a detailed block circuit diagram of the block $6E_{3A}$ of FIG. 16, one of the inputs of the lower side Wallace tree circuit 3W of this block is "0" or "1", not the output signal of a partial product generator. That is, because, when adding a decoding result of Booth decoder, a correction process is carried out without extending each decoding output bit to the most significant bit (i.e., 42-th bit) of the product. Therefore, this correction is carried out for the addition of bits higher than the second bit.

In order to carry out a correction calculation, block $6E_{3A}$ is modified to obtain the block $6E_{3B}$. That is, one input of the lower side Wallace tree circuit 3W located between $a_i$ and $a_{i-2}$ is "0", and one input of the lower side Wallace tree circuit 3W located at the bit $a_{i-1}$ is "1". Also, the $6E_{3A}$ block is modified to obtain the block $6E_{3C}$. That is, one input of the lower side Wallace tree circuit 3W located between $a_i$ and $a_{i-2}$ is "1", and one input of the lower side Wallace tree circuit 3W located at the bit $a_{i-1}$ is "0". The $6E_{3B}$ and $6E_{3C}$ blocks are alternately arranged. Note that, although one of the inputs of the right upper side Wallace tree circuit 3W is "0", in the block $6E_{3A}$ output signals from partial product generators are allocated to the Wallace tree circuits 3W in the blocks $6E_{3B}$ and $6E_{3C}$.

The block $6E_{3L}$ is obtained by modifying the block $6E_{3A}$ in the same way as in the modification of the block $6D_3$ to the $6D_{3L}$ block. Also, the block $6E_{4H}$ is obtained by modifying the block $6E_{3A}$ in the same way as in the modification of the block $6D_3$ to the block $6D_{4H}$.

Figure 24:
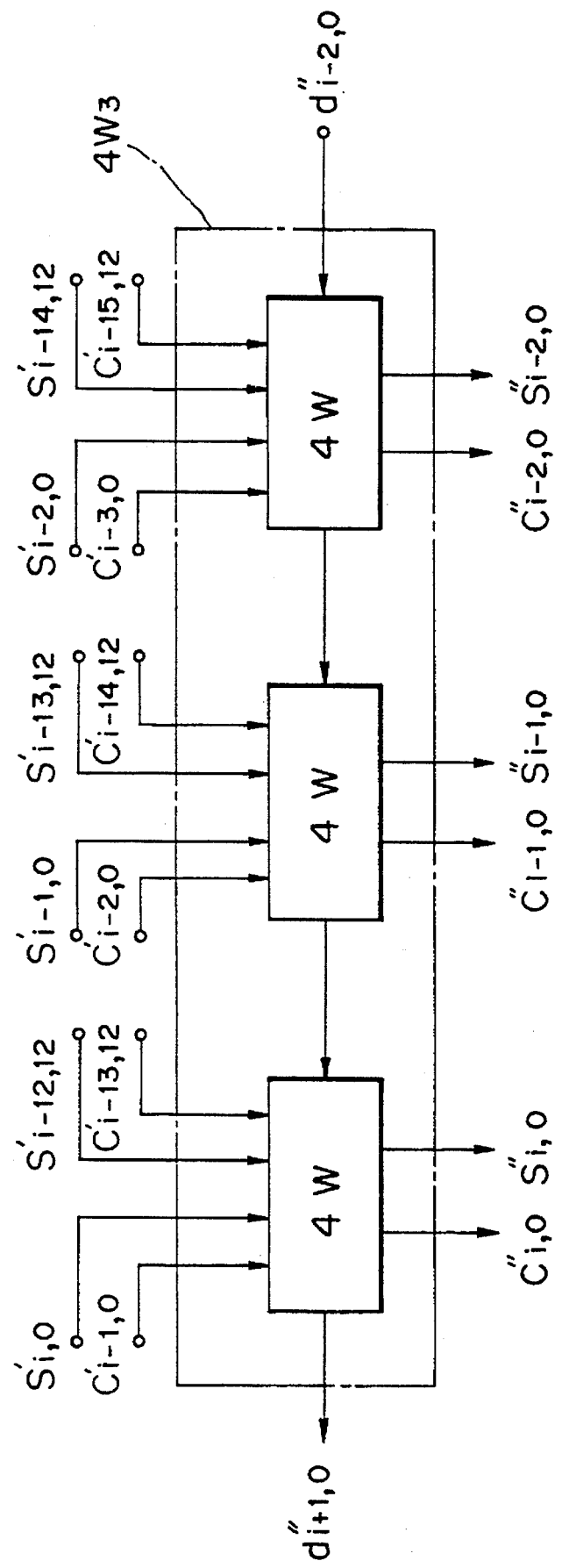
FIG. 24 is a block circuit diagram of the block $4W_3$ of FIG. 16.

In FIG. 24, which is a detailed circuit diagram of the block $4W_3$ of FIG. 16, the block $4W_3$ is constructed by three 4-input Wallace tree circuits 4W as illustrated in FIG. 4 or 5.

Figure 25:
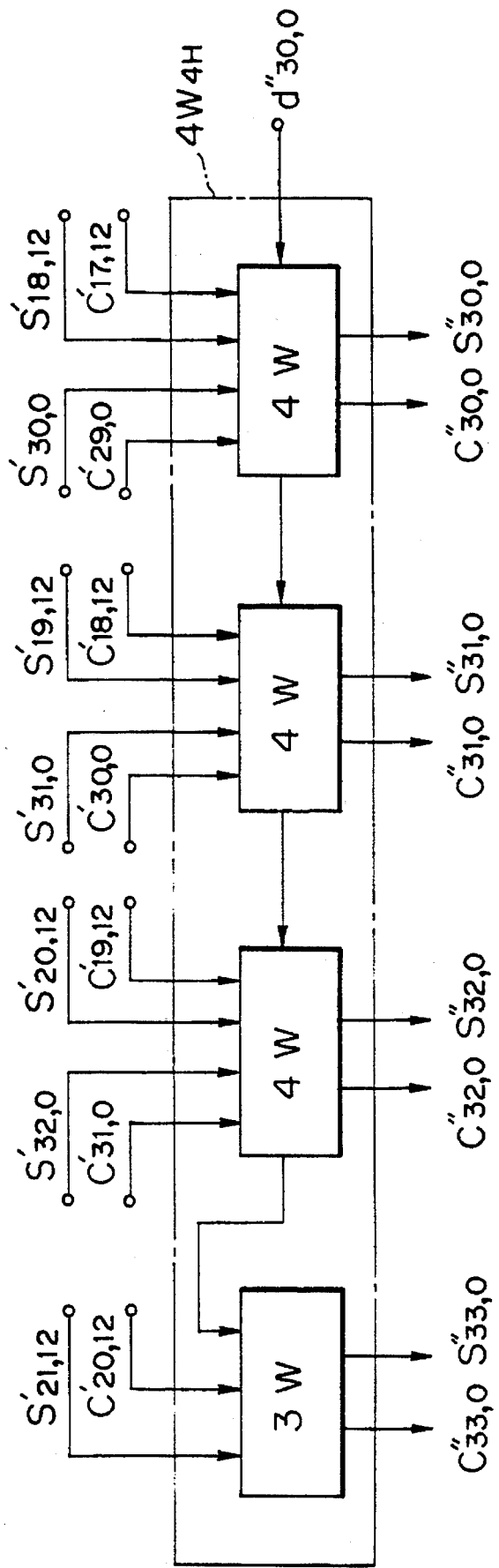
FIG. 25 is a block circuit diagram of the block $4W_{4H}$ of FIG. 16.

In FIG. 25, which is a detailed circuit diagram of the block $4W_{4H}$ of FIG. 16, the block $4W_{4H}$ is constructed by three 4-input Wallace tree circuits 4W as illustrated in FIG. 4 or 5, and one 3-input Wallace tree circuit 3W as illustrated in FIG. 3.

Figure 26:
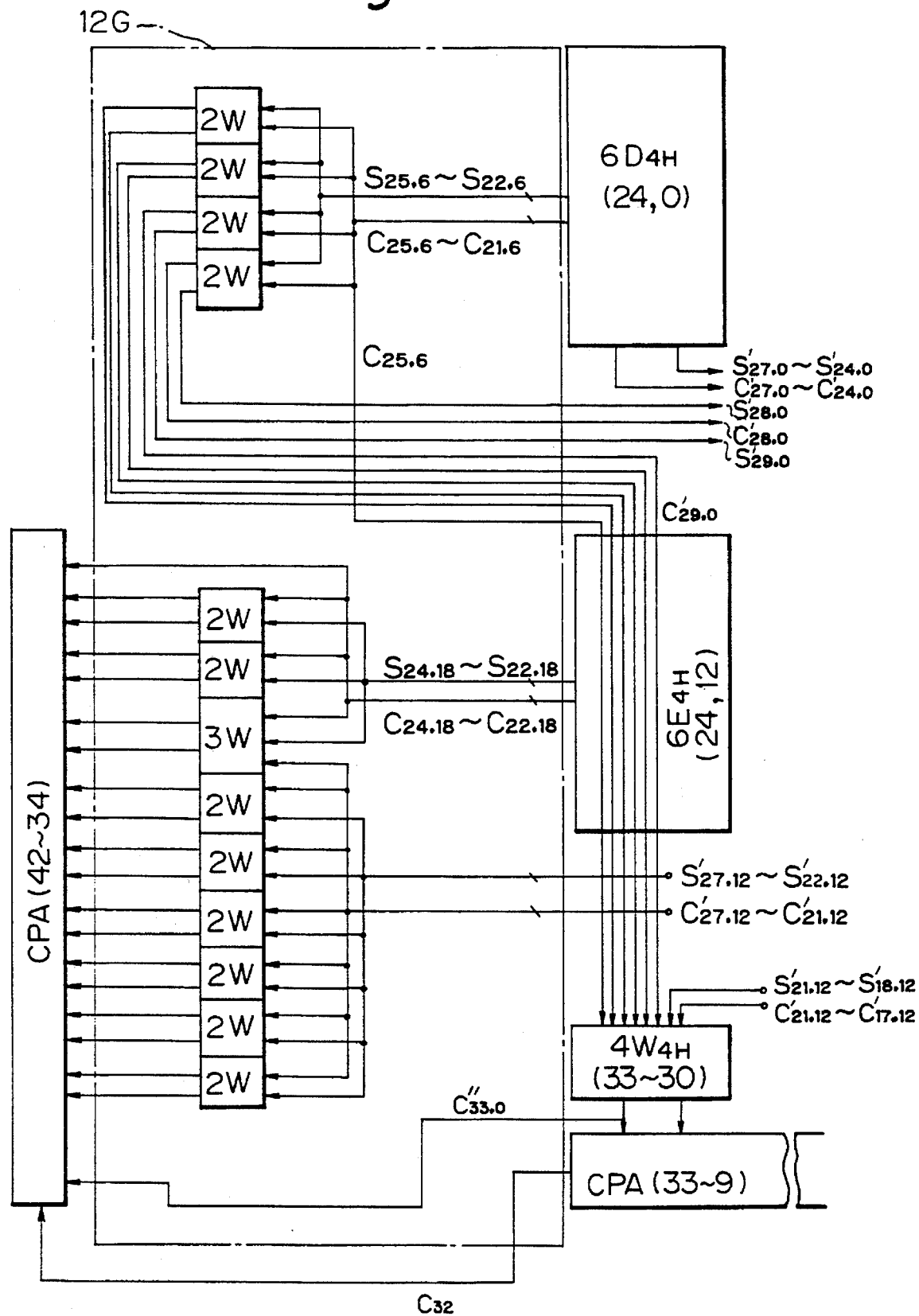
FIG. 26 is a block circuit diagram of the block 12G of FIG. 16.

In FIG. 26, which is a detailed circuit diagram of the block 12G of FIG. 16, the block 12G is constructed by 2-input Wallace tree circuits 2W as illustrated in FIGS. 22A and 22B, and 3-input Wallace tree circuit 3W as illustrated in FIG. 3.

In FIG. 27, which is a detailed circuit diagram of the block 12F of FIG. 16, the block 12F is constructed only by connections between the blocks.

In FIG. 16, CPA designates an adder of the carry propagation type which carries out an addition operation for sum signals and carry signals from the Wallace tree circuits such as $4W_3$ in each bit, and obtains a final output.

In the above-mentioned figures, $C_{XX}$ (XX being an arbitrary number) designates a carry signal, and $S_{XX}$ designates a sum signal.

Thus, each block is arranged as shown in FIG. 16 to form a 22×22 bit parallel multiplier using the 2nd-order modified Booth algorithm.

That is, the output signals of the blocks $6D_3$ or their modified blocks ($6D_3^*$, $6D_{3L}$, $6D_{4H}$, etc.) of each column are shifted by 6 bits in the right direction for the sum signals, and shifted by 5 bits in the right direction for the carry signals, and are input to one of the blocks $4W_3$ located at the bottom.

Also, the output signals of the $6E_{3A}$ blocks or their modified blocks ($6E_{3B}$, $6E_{3C}$, $6E_{3L}$, $6E_{4H}$, etc.) of each column are shifted by 6 bits in the left direction for the sum signals, and shifted by 7 bits in the left direction for the carry signals, and are input to one of the blocks $4W_3$ circuits located at the bottom.

Thus, in the above-mentioned embodiment, most of a multiplier can be laid out only by arranging the blocks $6D_3$, $6E_{3A}$ and $4W_3$ and their modified blocks with superpositioned connections, and a correspondence between a logic and a layout is set up in each block. As a result, the design is remarkably easy, as compared with the prior art. Therefore, the layout result also does not include redundant areas, so as to increase the integrated density.

Also, since a multi-input adder is divided into 4-input Wallace tree circuits 4W having a high speed, it thereby increases the speed of operation.

Figure 28B:
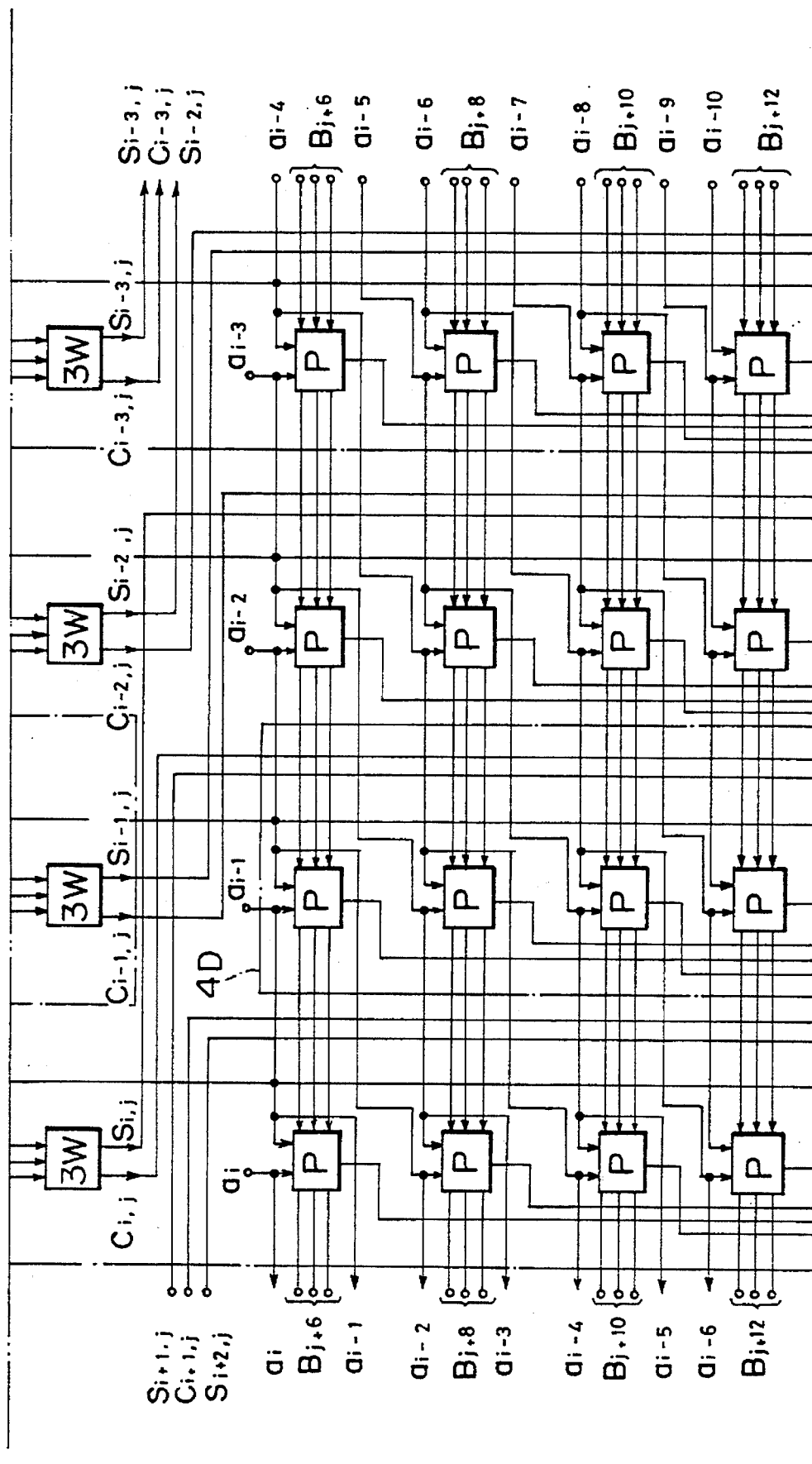
Figure 28C:
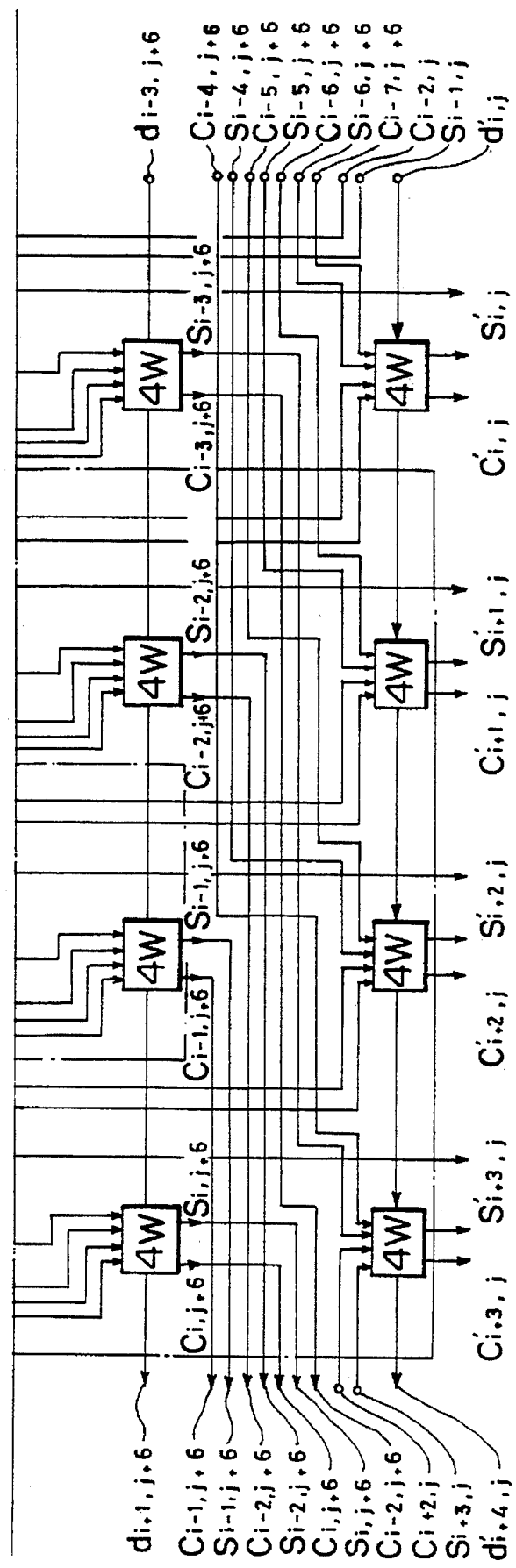

Note that, in the above-mentioned embodiment, although the multi-input adder processes every three bits, the present invention is not limited thereto. For example, in the case of addition for 28 bits, as illustrated in FIG. 28, the inputs are first divided into 3-input and 4-input groups in a $7D_3$ block, and then output signals from these groups are added in the blocks 4W. Then, 28-bit addition by a Wallace tree configuration is carried out for each bit using four $7D_3$ blocks and three 4W blocks. In case of 32 inputs, 4-input addition blocks are repetitively used.

Figure 29:
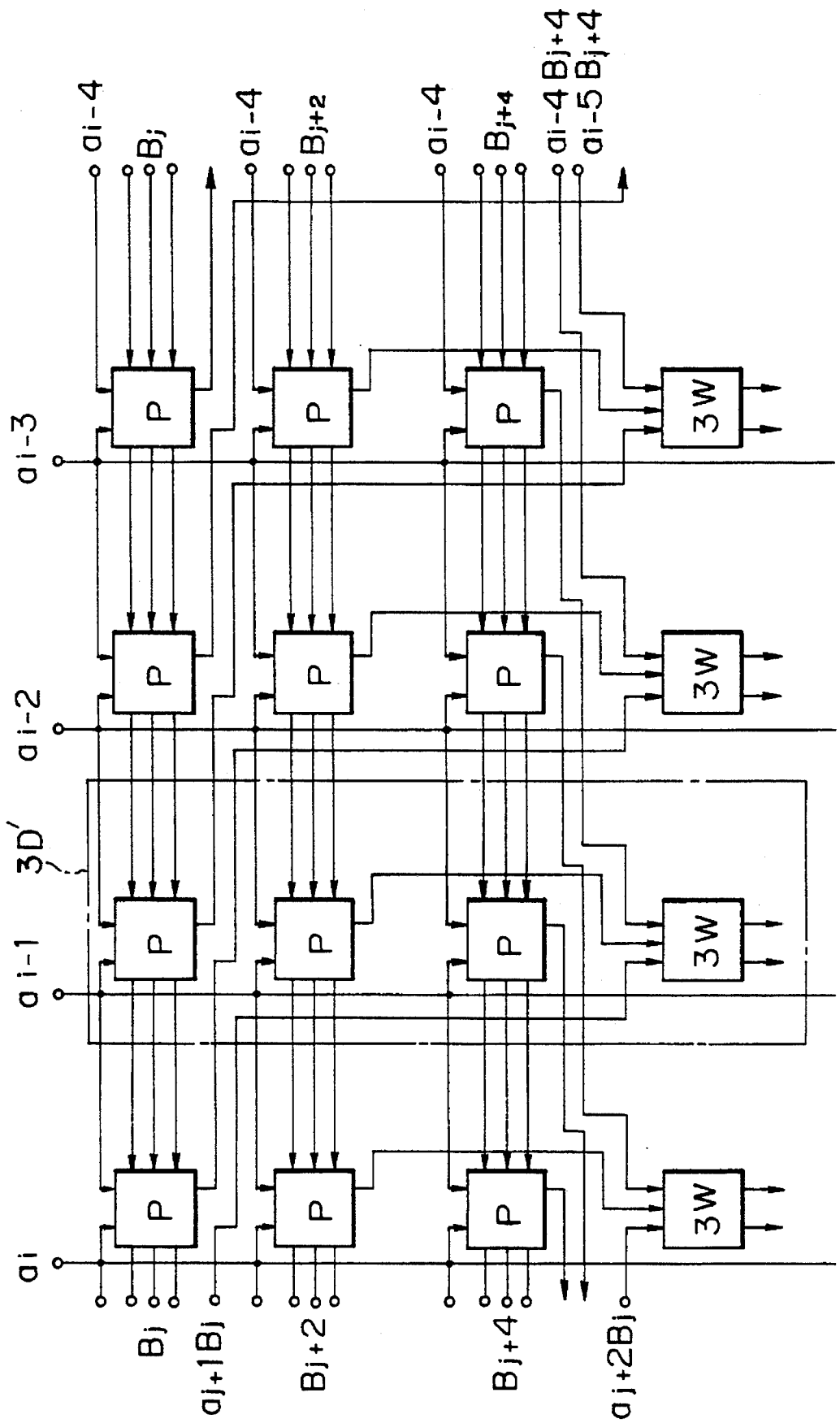
FIGS. 29 and 30 are block circuit diagrams of modifications of the block 3D of FIG. 17.
Figure 30:
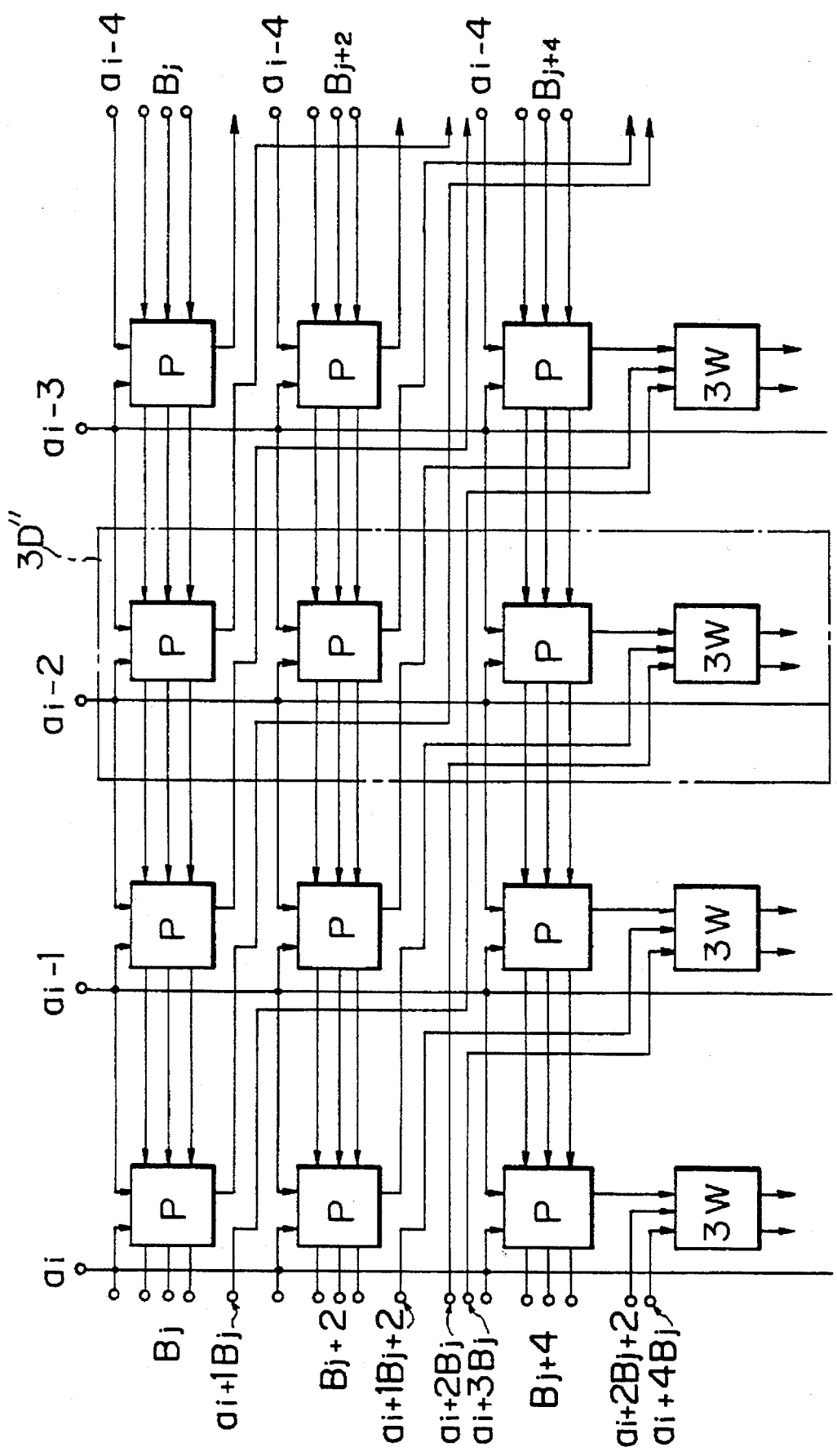

In FIGS. 29 and 30, which are modifications of the block 3D of FIG. 17 and the like, each block 3D' or 3D" is also formed by three partial product generators P and a 3-input Wallace tree circuit 3W. Although the 3-input Wallace tree circuit 3W of the block 3D of FIG. 17 or the like receives three product signals from the three partial product generators P within the same block 3D, the 3-input Wallace tree circuit 3W of the block 3D' or D" of FIG. 29 or 30 receives two product signals from the other blocks 3D' or 3D" as well as one product signal from the same block. For this purpose, the same multiplicand bit is supplied to inputs of all the partial product generators P of one block 3D' or 3D". The circuits of FIGS. 29 and 30 will be explained in detail below.

In the block 3D' of FIG. 29, a product signal of the upper located partial product generator P is supplied to the 3-input adder 3W of a block separated by two bits ($=2^{k-1}$) where k is the order of the modified Booth algorithm,) in the right direction from the block 3D'. Also, a product signal of the middle located partial product generator P is supplied to the 3-input adder 3W of the same block 3D'. Further, a product signal of the lower located partial product generator P is supplied to the 3-input adder 3W of a block separated by two bits ($=2^{k-1}$) in the left direction from the block 3D'. In other words, a product signal of a block separated by two bits in the left direction and a product signal of a block separated by two bits in the right direction as well as a product signal of the same block 3D' are supplied to the 3-input adder 3W of the block 3D'.

Similarly, in the block 3D" of FIG. 30, a product signal of the upper located partial product generator P is supplied to the 3-input adder 3W of a block separated by four bits ($=2^k$) in the right direction from the block 3D". Also, a product signal of the middle located partial product generator P is supplied to the 3-input adder 3W of a block separated by two bits ($2^{k-1}$) in the right direction from the block 3D". Further, a product signal of the lower located partial product generator P is supplied to the 3-input adder 3W of the same block 3D". In other words, a product signal of a block separated by four bits ($=2^k$) in the left direction and a product signal of a block separated by two bits ($=2^{k-1}$) in the left direction as well as a product signal of the same block 3D" are supplied to the 3-input adder 3W of the block 3D".

Similarly, in a block 3D''' (not shown), a product signal of the lower located partial product generator P is supplied to the 3-input adder 3W of a block separated by four bits ($=2^k$) in the left direction from the block 3D'''. Also, a product signal of the middle located partial product generator P is supplied to the 3-input adder 3W of a block separated by two bits ($=2^{k-1}$) in the direction from the block 3D'''. Further, a product signal of the lower located partial product generator P is supplied to the 3-input adder 3W of the same block 3D'''. In other words, a product signal of a block separated by four bits ($=2^k$) in the right direction and a product signal of a block separated by two bits in the right direction as well as a product signal of the same block 3D''' are supplied to the 3-input adder of the block 3D'''.

Figure 31:
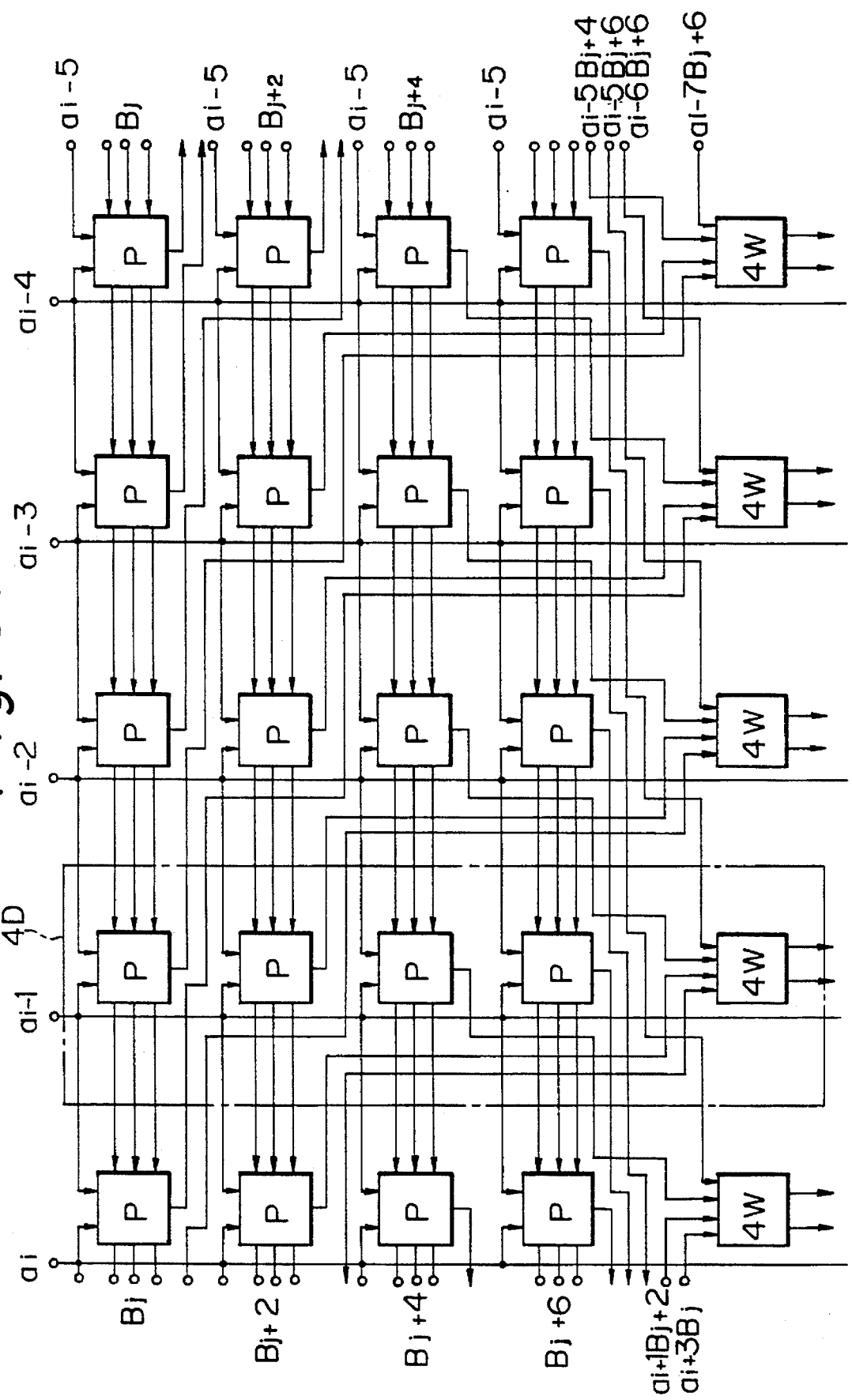
FIG. 31 is a block circuit diagram of a modification of the block 3D' or 3D" of FIG. 29 or 30.

The blocks 3D' and 3D" of FIGS. 29 and 30 are applied to a block formed by four partial product generators and a 4-input Wallace tree circuit (adder) as illustrated in FIG. 31.

In a block 4D of FIG. 31, a product signal of the first partial product generator P is supplied to the 4-input adder 4W of a block separated by three bits ($=3\times 2^{k-2}$) in the right direction from the block 4D. Also, a product signal of the second partial product generator P is supplied to the 4-input adder 4W of a block separated by one bit ($2^{k-2}$) in the right direction from the block 4D. Further, a product signal of the third partial product generator P is supplied to the 4-input adder 4W of a block separated by one bit ($=2^{k-1}$) in the left direction from the block 4D. Further, a product signal of the fourth partial product generator P is supplied to the 4-input adder 4W of a block separated by three bits ($=3\times 2^{k-2}$) in the left direction from the block 4D. In other words, a product signal of a block separated by three bits in the left direction, a product signal of a block separated by one bit in the left direction a product signal of a block separated by one bit in the right direction, and a product signal of a block separated by three bits in the right direction are supplied to the 4-input adder 4W of the block 4D.

Figure 32A:
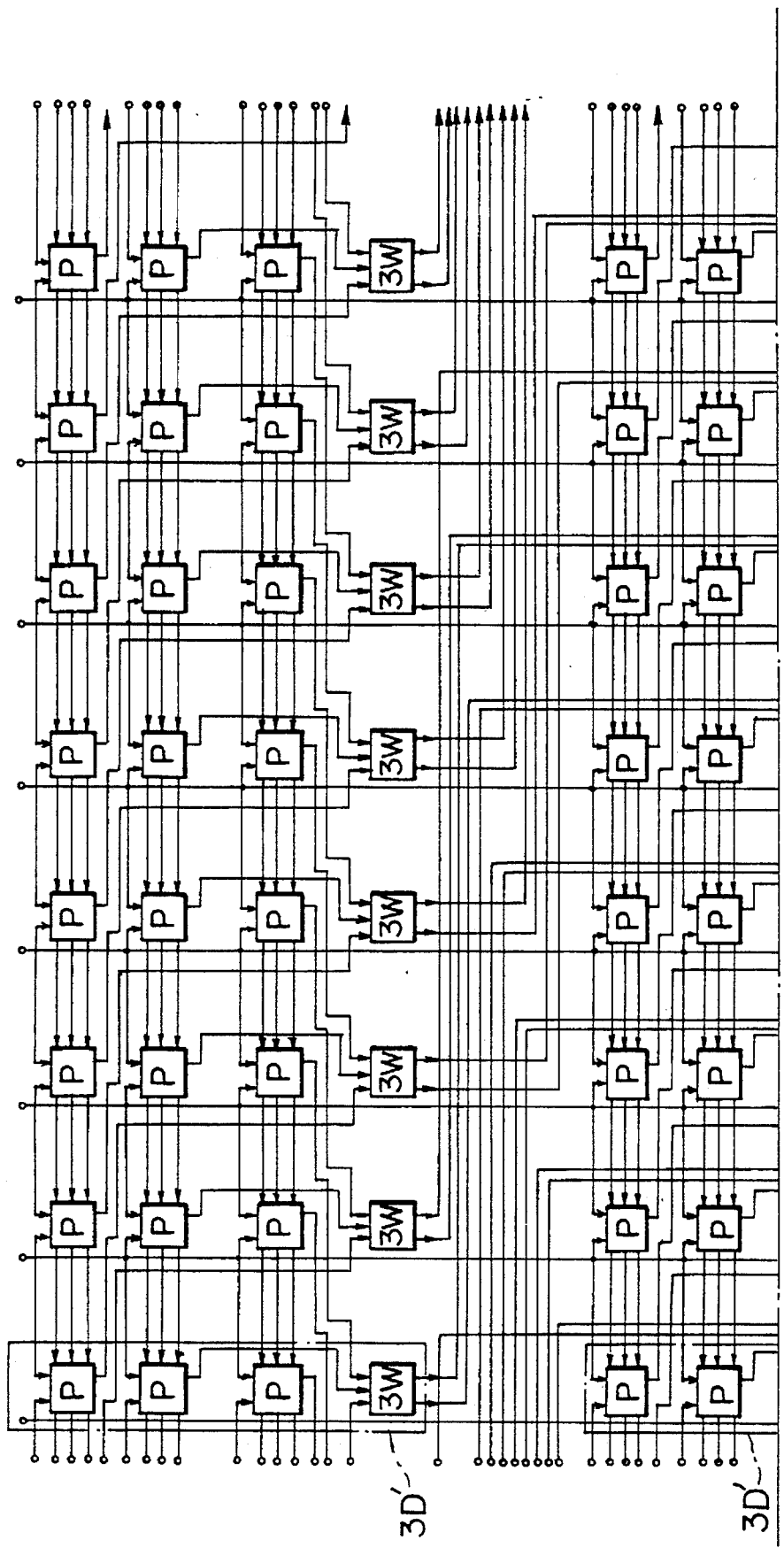
Figure 32B:
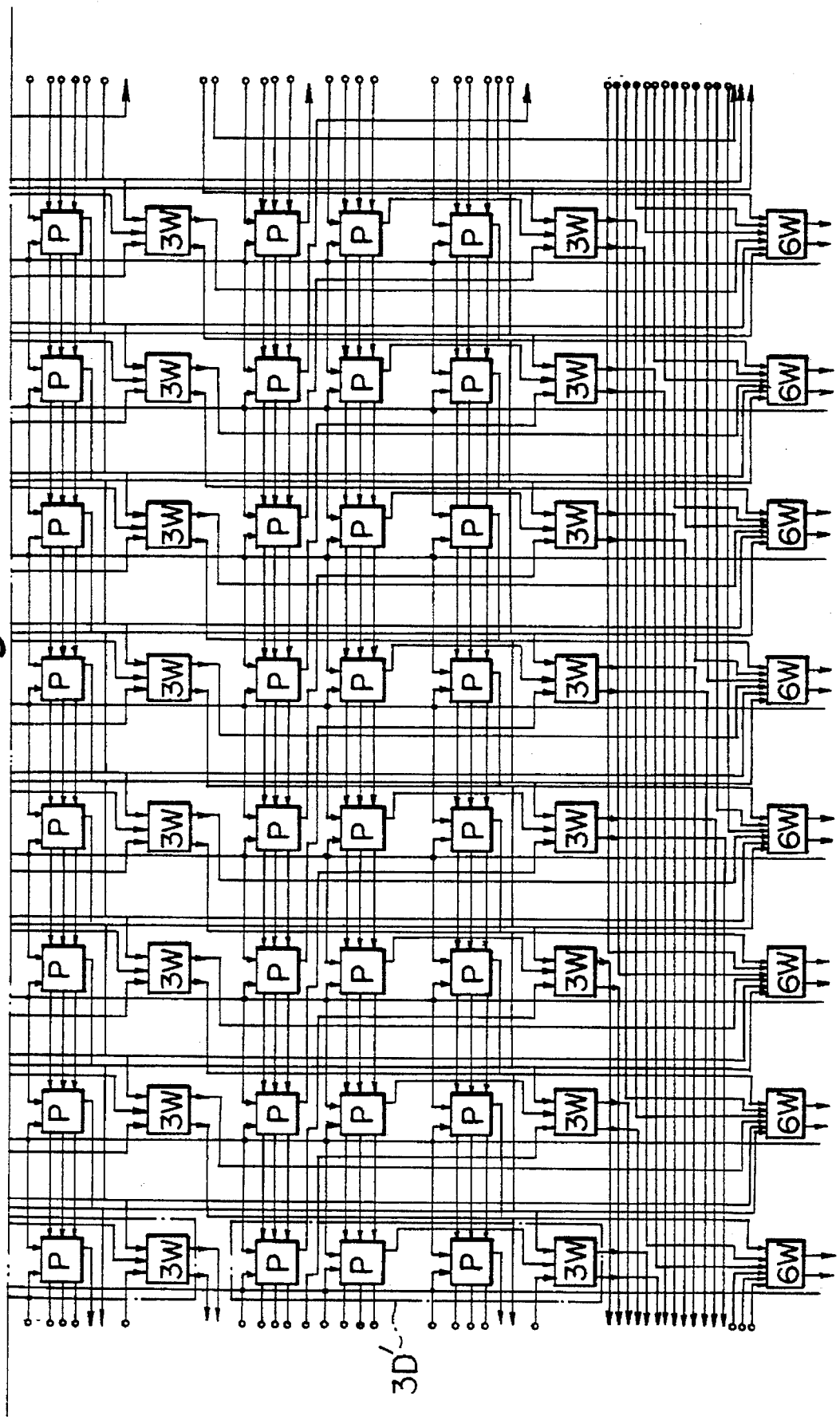

Also, three rows of the blocks 3D' of FIG. 29 are combined to form a multiplier as illustrated in FIG. 32. That is, in FIG. 32, a sum signal of the upper block 3D' is shifted by 6 bits in the right direction, and is supplied to the corresponding 6-input Wallace tree circuit 6W, and a carry-out signal of the upper block 3D' is shifted by 5 bits in the right direction, and is supplied to the corresponding 6-input Wallace tree circuit 6W. Also, a sum signal of the middle block 3D' is not shifted, and is supplied to the corresponding 6-input Wallace tree circuit 6W, and a carry-out signal of the middle block 3D' is shifted by 1 bit in the left direction, and is supplied to the corresponding 6-input Wallace tree circuit 6W. Further, a sum signal of the lower block 3D' is shifted by 6 bits in the left direction, and is supplied to the corresponding 6-input Wallace tree circuit 6W, and a carry-out signal of the lower block 3D' is shifted by 7 bits in the left direction, and is supplied to the corresponding 6-input Wallace tree circuit 6W.

Figures 33, 33A:
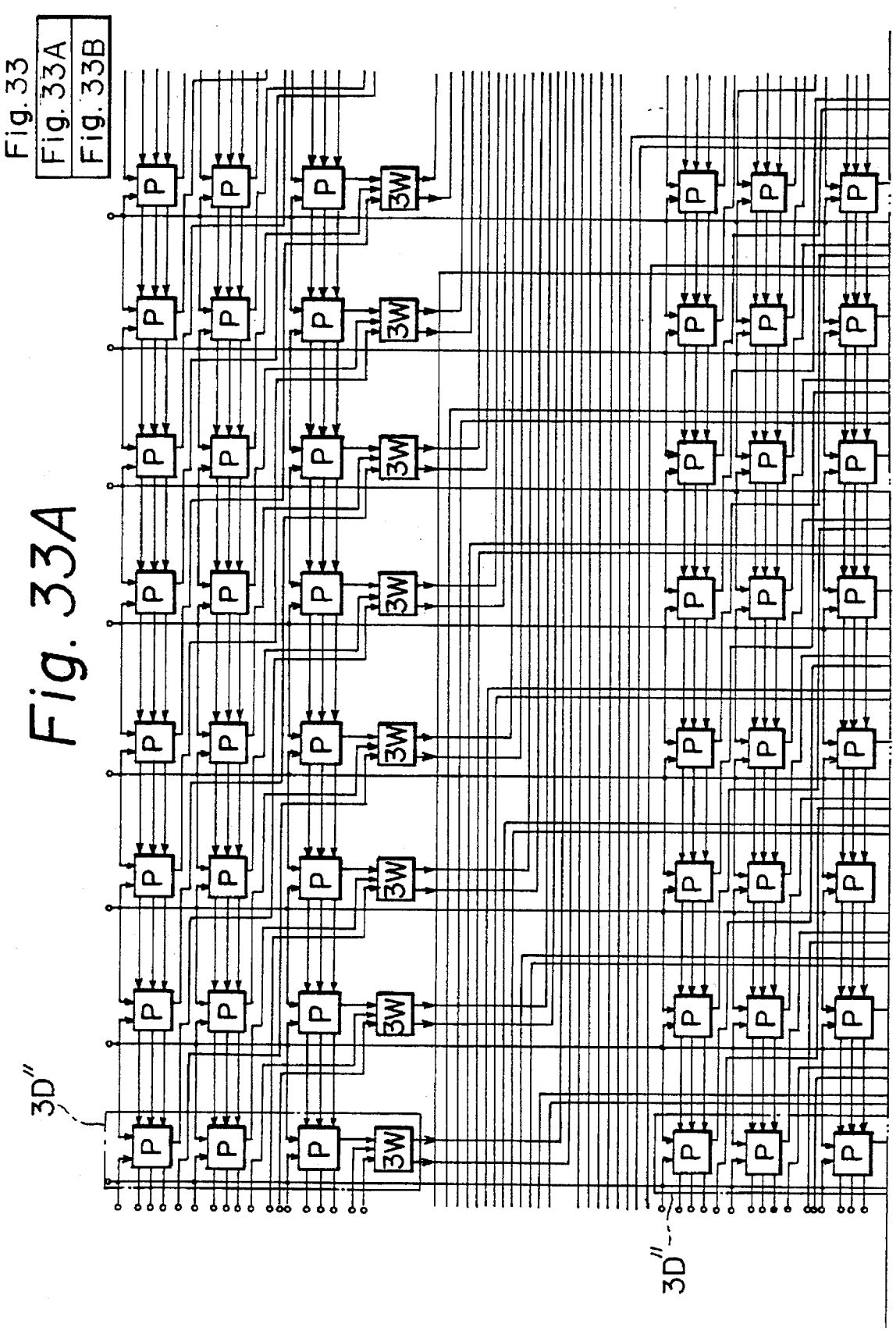
Figure 33B:
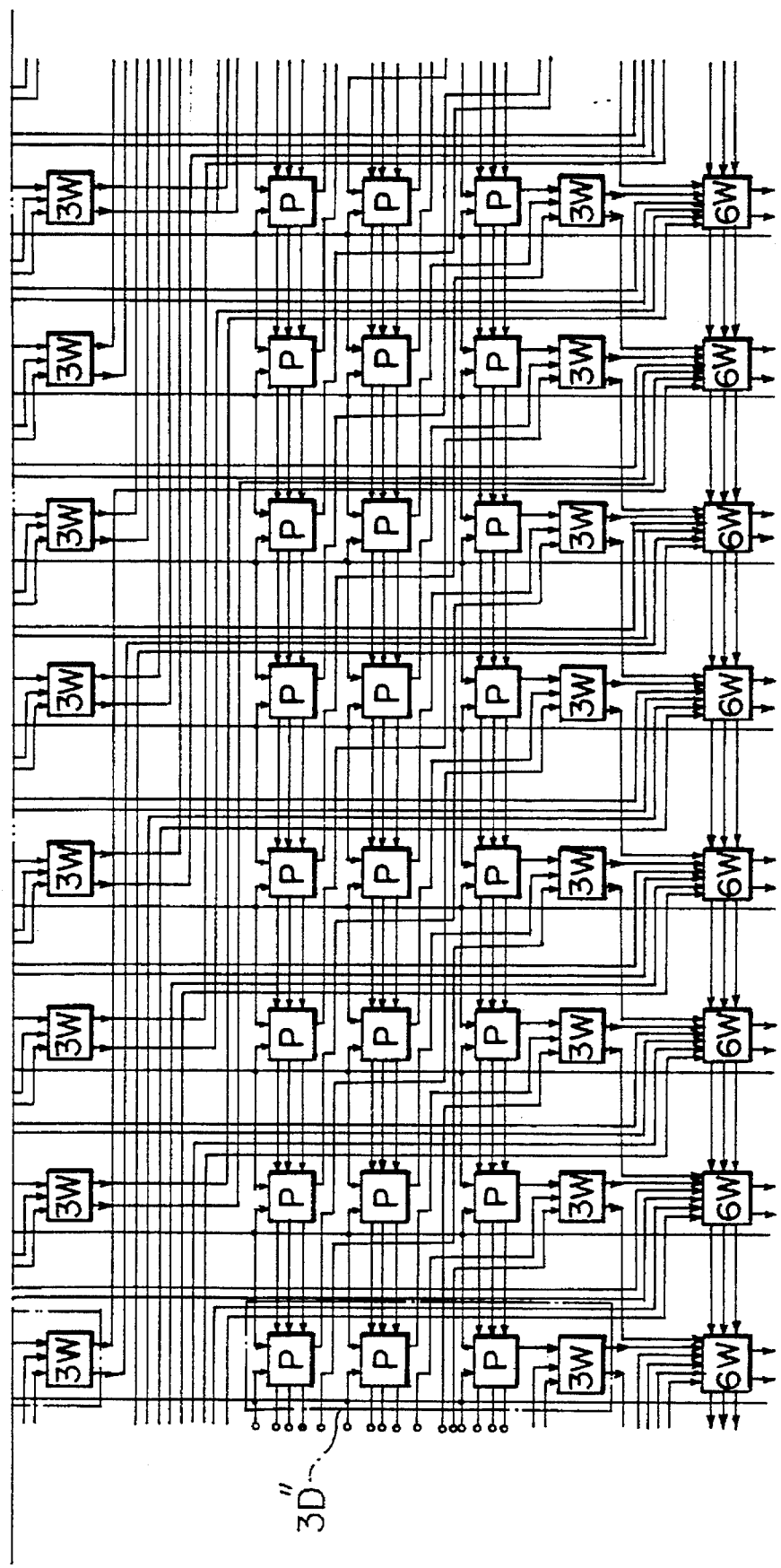

Similarly, three rows of the blocks 3D" of FIG. 30 are combined to form a multiplier as illustrated in FIG. 33. That is, in FIG. 33, a sum signal of the upper block 3D" is shifted by 12 bits in the right direction, and is supplied to the corresponding 6-input Wallace tree circuit 6W, and a carry-out signal of the upper block 3D' is shifted by 11 bits in the right direction, and is supplied to the corresponding 6-input Wallace tree circuit 6W. Also, a sum signal of the middle block 3D" is not shifted by 6 bits in the right direction, and is supplied to the corresponding 6-input Wallace tree circuit 6W, and a carry-out signal of the middle block 3D" is shifted by 5 bits in the right direction, and is supplied to the corresponding 6-input Wallace tree circuit 6W. Further, a sum signal of the lower block 3D" is not shifted, and is supplied to the corresponding 6-input Wallace tree circuit 6W, and a carry-out signal of the lower block 3D" is shifted by 1 bit in the left direction, and is supplied to the corresponding 6-input Wallace tree circuit 6W.

In FIGS. 32 and 33, all the blocks are the same, but it is possible to combine different types of blocks. For example, the block 3D" of FIG. 33 can be replaced with the block 3D' of FIG. 29. In this case, the sum signals of the upper, middle, and lower blocks 3D' are shifted by 10, 4, and 0 bits, respectively in the right direction, and the carry-out signals of the upper, middle, and lower blocks 3D' are 9, 3 bits in the right direction, and 1 bit in the left direction, respectively.

Also, in FIGS. 32 and 33, if the block 4D of FIG. 31 is used, a sum signal of an upper block is shifted by 16 bits in the right direction, and is supplied to the corresponding 6-input adder 6W. Also, a carry-out signal is shifted by 15 bits in the right direction and is supplied to the corresponding 6-input adder 6W. The same thing applies to the other blocks.

In the above-mentioned embodiment, although the use of a 2nd order modified Booth algorithm is a premise, a higher-order modified Booth algorithm such as a three-bit Booth algorithm, or a method for directly multiplying a multiplier with a multiplicand can be applied.

As explained above, according to the present invention, the layout of the entire multiplier can be a rectangle to increase the density of integration and to increase the speed of operation. Also, since the correspondence between logic and layout is easy, the design of multipliers can be easily made.

Note that the multiplier according to the present invention can be manufactured by one integrated circuit (IC) chip.

The multiplier according to the present invention can be used advantageously in a multiplication block of an integer calculating unit (IU) or a floating-point calculating unit (FPU) incorporated in a microprocessor or a digital signal processing unit (DSP). If a multiplier is large due to the small integration density, it is impossible to incorporate all of such a multiplier into the above-mentioned units. For example, in order to carry out a 54×54 bit multiplication, a 54×27 bit multiplier for a multiplication of a mantissa is incorporated into the unit, to repeat the operation of the multiplier twice. As a result, the multiplication time is twice as long as addition time or subtraction time. In this regard, the multiplier according to the present invention is of a rectangular configuration having a regular arrangement including connections, enabling a high density of integration. The multiplier according to the present invention can be optimized for such a 54×54 bit multiplier so that the multiplication time is the same as the addition time or the subtraction time.

Figure 34:
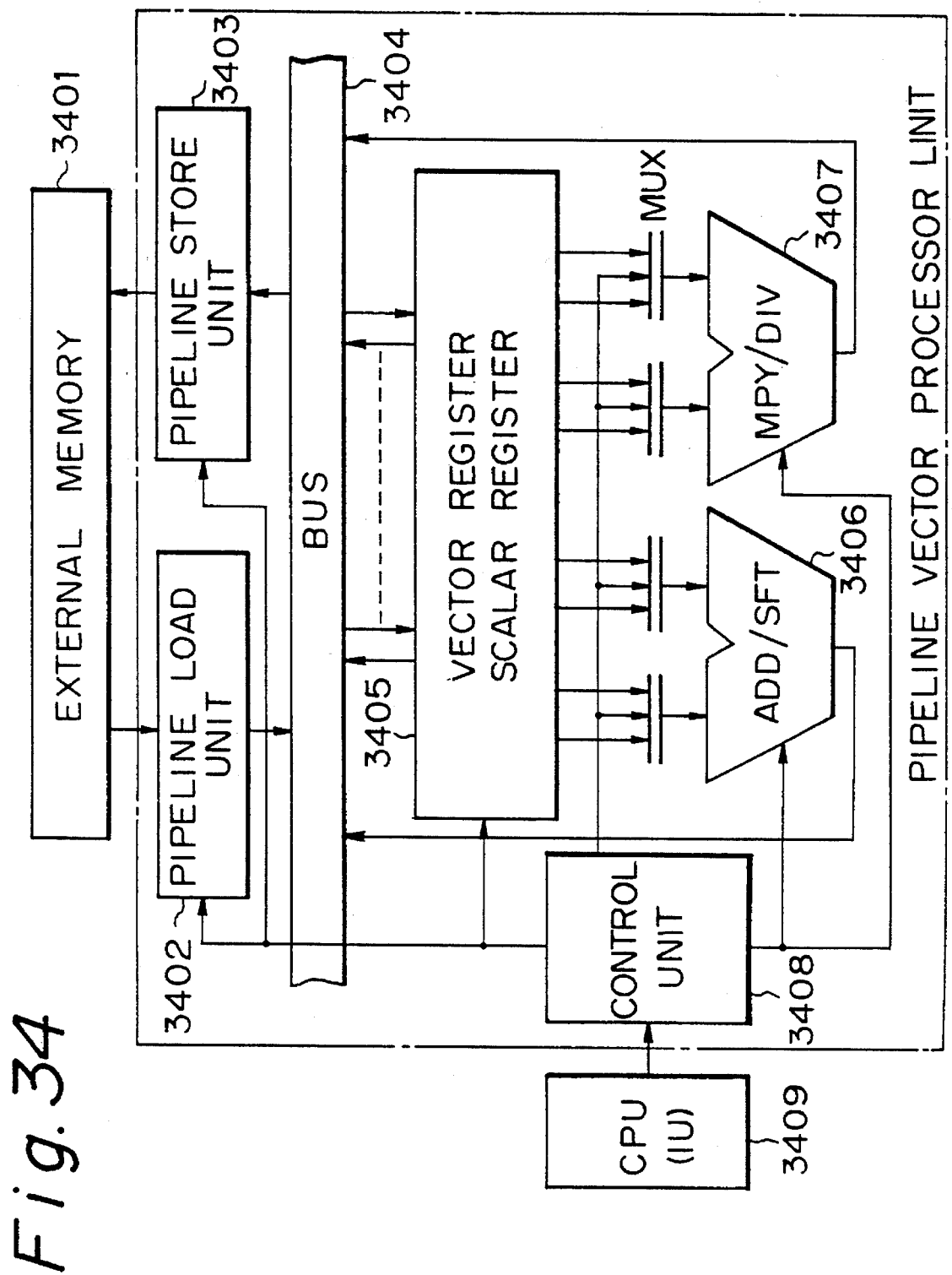
FIG. 34 is a block circuit diagram of a pipeline vector processing unit to which the present invention is applied.

For example, the multiplier according to the present invention is applied to a pipeline vector processor unit as illustrated in FIG. 34. In FIG. 34, the pipeline vector processor unit is connected between an external memory 3401 and a central processing unit (CPU) or the integer calculation unit (IU) 3409. The pipeline vector processor includes a pipeline load unit 3402, a pipeline store unit 3403, a bus 3404, a vector register/scalar register 3405, addition calculation blocks 3406 and 3407, and a control unit 3408. The calculation block 3406 includes an addition/subtraction circuit (ADD) and a shift circuit (SFT), and the calculation block 3407 includes a multiplier circuit (MPY) and a division circuit (DIV). When a multiplication is carried out, a vector multiplication instruction is supplied from the CPU 3409 to the control unit 3408. In this case, operand data (multiplicands and multipliers) required for such a multiplication is fetched by a load instruction of the CPU 3409 from the external memory 3401 and is stored via the pipeline load unit 3402 in the vector register of the vector unit/scalar unit 3405. Upon detection of such data being stored in the vector register, the control unit 3408 operates the multiplier circuit (MPY) via multiplexers MUX, so that a multiplication result is again stored in the vector register. In this state, upon receipt of a store instruction of the CPU 3409, the control unit 3408 moves the multiplication result from the vector register via the pipeline store unit 3403 to the external memory 3401. Note that, if the capacity of the vector register is large, a calculation such as multiplication can be carried out without fetching from the external memory 3401, to increase the speed of operation.

Figure 35:
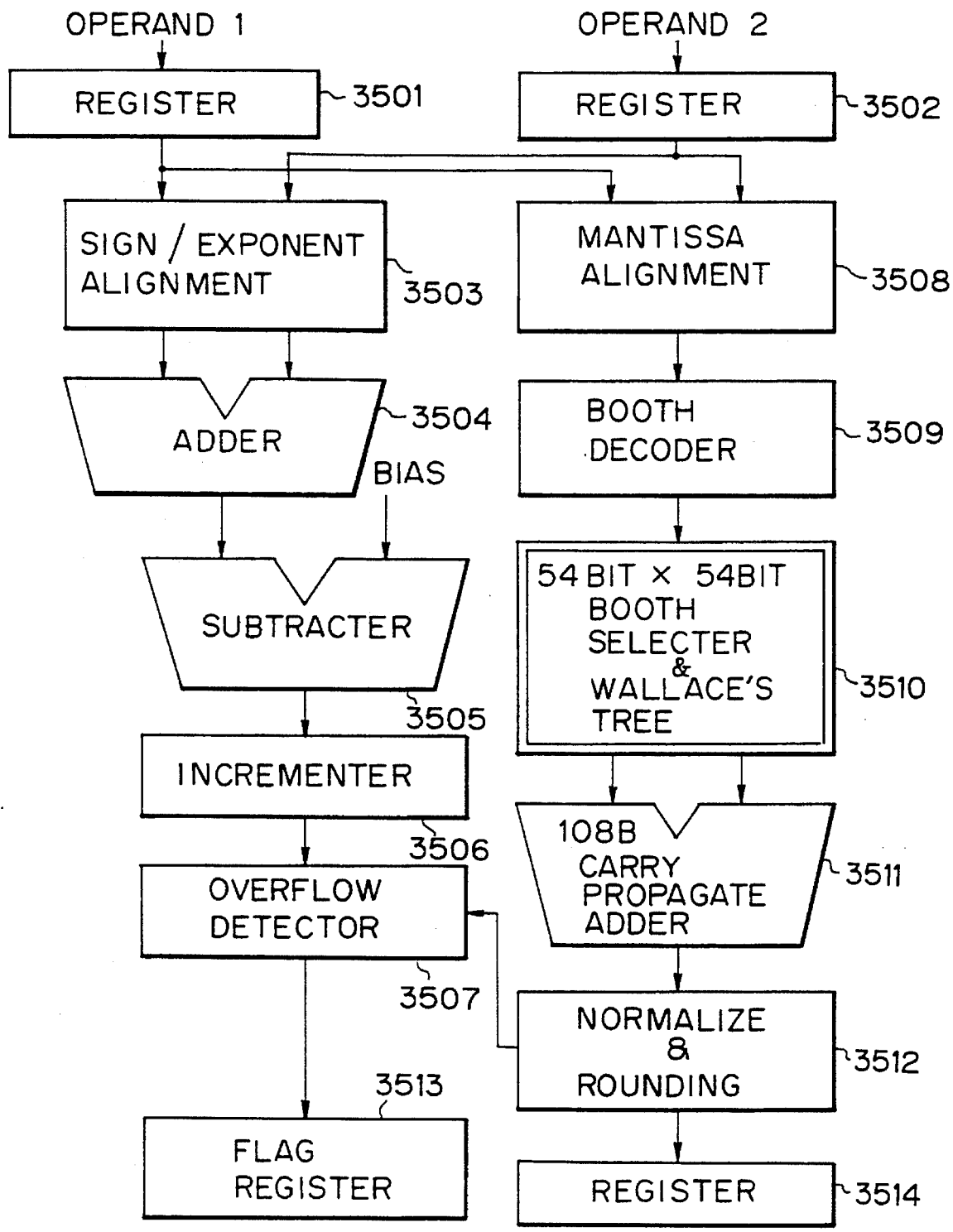
FIG. 35 is a block circuit diagram of the multiplier circuit of FIG. 34.

The multiplier circuit of FIG. 34 is illustrated in more detail in FIG. 35. In FIG. 35, 3501 and 3502 designate registers for receiving operand 1 and operand 2, respectively, 3503 a sign/exponent alignment, 3504 an adder, 35 a subtracter, 3506 an incrementer, 3507 an overflow detector, 3508 a mantissa alignment, 3509 a Booth decoder, 3510 a Booth selector and Wallace tree circuit, 3511 a carry propagation adder (CPA), 3512 a normalizing/rounding circuit, 3513 a sign register, and 3514 a register. The present invention relates to the Booth selector and Wallace tree configuration 3510.

I claim:

1. An M×N-bit multiplier comprising:

M multiplicand bit transmission lines arranged along a first direction;

N multiplier bit transmission lines arranged along a second direction substantially perpendicular to the first direction;

M×N partial product generators, each provided at one intersection between said multiplicand bit transmission lines and said multiplier bit transmission lines;

R rows of M first multi-input adders comprising Wallace tree type adders arranged hierarchically and for adding output signals of S of said partial product generators located adjacently in a column, where R is at least two and less than N, and S=(N/R)≧5; and at least one row of M second multi-input adders comprising Wallace tree type adders arranged hierarchically and adding output signals of said first multi-input adders, said S partial product generators and one of said first multi-input adders forming one basic cell, M×R basic cells being repetitively arranged in a matrix corresponding to the arrangement of said first multi-input adders, each of said R basic cells in a column processing the same set of corresponding multiplicand bit signals, and the output signal lines of said basic cells being extended by predetermined bits along the second direction being connected to the corresponding said second multi-input adders arranged between the basic cell rows using repetitive line patterns forming a substantially rectangular layout configuration of said multiplier.

2. A multiplier as set forth in claim 1, wherein a set of S multiplicand bit transmission lines are extended by predetermined bits successively in each column of said partial product generators of one basic cell and connected to the respective partial product generators, to calculate partial products in dependence upon signals of said set of S multiplicand bit transmission lines, said one of said first multi-input adders of said one basic cell adding output signals of said S partial product generators thereof together.

3. A multiplier as set forth in claim 2, wherein one of said S multiplicand bit transmission lines is shifted by 0 bit.

4. A multiplier as set forth in claim 3, wherein a first of said multiplier bit transmission lines is not extended in the second direction and is connected to a first partial product generator of one basic cell, a second of said multiplicand bit transmission lines is extended by $2^{k-1}$ bits toward a higher multiplicand bit position and connected to a second partial product generator of said basic cell, a third of said multiplicand bit transmission lines is extended by $2 \times 2^{k-1}$ bits toward a higher multiplicand bit position and connected to a third partial product generator of said basic cell, and output signals of said three partial product generators are connected to said first multi-input adder of said basic cell.

5. A multiplier as set forth in claim 3, wherein a first of said multiplicand bit transmission lines is not extended in the second direction and is connected to a first partial product generator of said basic cell;

a second of said multiplicand bit transmission lines is extended by $2^{k-1}$ bits toward a higher multiplicand bit position and is connected to a second partial product generator of said basic cell;

a third of said multiplicand bit transmission lines is extended by $2 \times 2^{k-1}$ bits toward a higher multiplicand bit position and is connected to a third partial product generator of said basic cell;

a fourth multiplicand bit transmission lines is extended by $3 \times 2^{k-1}$ bits toward a higher multiplicand bit position and is connected to a fourth partial product generator of said basic cell; and output signals of said four partial product generators being connected to said first multi-input adder of said basic cell.

6. A multiplier as set forth in claim 1, wherein output signal lines of said first multi-input adders are extended by predetermined bits in the second direction and are connected to said second multi-input adders in another column.

7. A multiplier as set forth in claim 1, wherein output signal lines of said first multi-input adders of one row are extended by predetermined bits toward a lower multiplicand bit position and are connected to said second multi-input adders, and output signal lines of said first multi-input adders another row are extended by predetermined bits toward a higher multiplicand bit position and are connected to said second multi-input adders.

8. A multiplier as set forth in claim 1, wherein said multiplier bit transmission lines comprise groups of decoding transmission lines, and when using a K-th order modified Booth algorithm, N being replaced by a number equal to (N/K).

9. A multiplier as set forth in claim 1, wherein the same multiplicand bit transmission lines are connected to said S partial product generators of one basic cell, to calculate partial products in independence upon signals of the corresponding multiplicand bit transmission line, said first multi-input adder of said one basic cell adding output signals of partial product generators of different basic cells.

10. A multiplier as set forth in claim 1, wherein said basic cells comprise a first type of basic cell having $S_1$ partial product generators and a second type of basic cell having $S_2$ partial product generators for processing an odd number of inputs, output signals of said two types of basic cells being input to one of said second multi-input adders to generate signals of the corresponding bit position.

11. A multiplier as set forth in claim 10, wherein an input signal line of a first one of said partial product generators of one basic cell is extended by $2^{k-1}$ bits toward a lower multiplicand bit position and is connected to a corresponding one of said first multi-input adders, an output signal line of a second one of said partial product generators of one basic cell being connected to said first multi-input adders of said basic cell, an output signal line of a third one of said partial product generators of one basic cell being extended by $2^{k-1}$ bits toward a higher multiplicand bit position and being connected to a corresponding one of said second multi-input adders.

12. A multiplier as set forth in claim 10, wherein an output signal line of a first one of said partial product generators of one basic cell is extended by $2 \times 2^{k-1}$ bits toward a lower multiplicand bit position and connected to a corresponding one of said first multi-input adders, an output line of a second one of said partial product generators of said basic cell being extended by $2^{k-1}$ bits toward a lower multiplicand bit position and being connected to a corresponding one of said first multi-input adders, an output signal line of a third one of said partial product generators of said basic cell being connected to said first multi-input adder of said basic cell.

13. A multiplier as set forth in claim 1, wherein each of said basic cells comprises three partial product generators and a full adder as a first multi-input adder.

14. A multiplier as set forth in claim 1, wherein each of said basic cells comprises four partial product generators and a four-input adder as a first multi-input adder.

15. A multiplier as set forth in claim 1, further comprising $T_{th}$ multi-input adders arranged along the first direction, to add output signals of (T-1)th multi-input adders, wherein T is an integer whole number at least equal to 3.

16. A multiplier as set forth in claim 1, wherein each of said basic cells are functional basic cells and said layout configurations of said multiplier is made substantially rectangular using only the functional basic cells.

17. A multiplier as set for in claim 1, wherein said multiplier comprises an IC chip.

18. An M×N-bit multiplier having a layout configuration and comprising:

M multiplicand bit transmission lines arranged along a first direction and transmitting multiplicand bit signals;

N multiplier bit transmission lines arranged along a second direction substantially perpendicular to the first direction;

M×N partial product generators, each provided at one intersection between said multiplicand bit transmission lines and said multiplier bit transmission lines;

R rows of M first multi-input adders comprising wallace tree type adders arranged hierarchically and being arranged in an arrangement and adding output signals of S of said partial product generators located adjacently in a column, where R is at least two and less than N, and S=(N/R)≧5; and at least one row of M second multi-input adders comprising Wallace tree type adders arranged hierarchically and adding output signals of said first multi-input adders, wherein, said S partial product generators and one of said first multi-input adders forming one basic cell, M×R basic cells being repetitively arranged in a matrix corresponding to the arrangement of said first multi-input adders, each of R basic cells arranged in a column processing the same corresponding multiplicand bit signals, said basic cells having output signal lines extended by predetermined bits along the second direction to be connected to the corresponding said second multi-input adders arranged between the basic cell rows using repetitive line patterns forming a substantially rectangular layout configuration of said multiplier, each of said basic cells comprising four partial product generators and a four-input adder as one of the first multi-input adders, and output signal lines of said first multi-input adders are extended by predetermined bits in the second direction and are connected to said second multi-input adders in another column.

* * * * *

UNITED STATES PATENT AND TRADEMARK OFFICE
CERTIFICATE OF CORRECTION

PATENT NO. : 5,465,226
DATED : NOVEMBER 7, 1995
INVENTOR(S) : Gensuke GOTO

It is certified that error appears in the above-indentified patent and that said Letters Patent is hereby corrected as shown below:

Col. 3, line 59, "FIG. 2 is" should be --FIG. 2, is--.

Col. 4, line 18, "$B_o , B_1 , B_2 ,$" should be --$B_o, B_1, B_2,$--;
line 21, "$B_o$" should be --$B_o,$--;
line 22, ", $B_1 , B_2 ,$ and $B_3 ,$" should be --$B_1, B_2,$ and $B_3,$--;

Col. 7, line 41, "$6E_{3A}$" should be --$6E_{3A},$--.

Col. 8, line 9, "$(=2^{k-1})$ where" should be --$(=2^{k-1}$ where--.

Col. 9, line 2, "direction" should be --direction;--.

Col. 13, line 30, "wallace" should be --Wallace--.

Signed and Sealed this

Eighth Day of October, 1996

Attest:

BRUCE LEHMAN

*Attesting Officer*     *Commissioner of Patents and Trademarks*